US012365017B2

(12) United States Patent
Cole et al.

(10) Patent No.: US 12,365,017 B2
(45) Date of Patent: Jul. 22, 2025

(54) SYSTEMS AND METHODS FOR TANK CLEANING

(71) Applicant: Veolia Nuclear Solutions, Inc., Westminster, CO (US)

(72) Inventors: Matthew Denver Cole, Fort Collins, CO (US); Paul Damon Linnebur, Fort Collins, CO (US); Jacob Andrew Riesenweber, Fort Collins, CO (US); Maegan Fay Gilmour, Fort Collins, CO (US)

( * ) Notice: Subject to any disclaimer, the term of this patent is extended or adjusted under 35 U.S.C. 154(b) by 388 days.

(21) Appl. No.: 17/931,315

(22) Filed: Sep. 12, 2022

(65) Prior Publication Data

US 2023/0071829 A1 Mar. 9, 2023

Related U.S. Application Data

(62) Division of application No. 16/639,522, filed as application No. PCT/US2018/000303 on Aug. 17, 2018, now Pat. No. 11,440,064.

(60) Provisional application No. 62/546,859, filed on Aug. 17, 2017.

(51) Int. Cl.
*B08B 9/08* (2006.01)
*B08B 9/093* (2006.01)

(52) U.S. Cl.
CPC .......... *B08B 9/0808* (2013.01); *B08B 9/0813* (2013.01); *B08B 9/093* (2013.01); *A46B 2200/3006* (2013.01)

(58) Field of Classification Search
CPC ..... B08B 9/0813; B08B 9/093; B08B 9/0936; B08B 9/087; B08B 9/0808; A46B 2200/3006; A46B 2200/3013; A46B 2200/3073
See application file for complete search history.

(56) References Cited

U.S. PATENT DOCUMENTS 4,220,170 A * 9/1980 Hebert .................... B63B 57/02 239/165
9,468,957 B1 * 10/2016 Al Shammari ........... B08B 1/36
2004/0134518 A1 * 7/2004 Kraus ........................ B08B 5/04 15/302
2006/0243303 A1 * 11/2006 Harr ......................... B08B 9/045 15/104.095

OTHER PUBLICATIONS

U.S. Appl. No. 16/639,522, U.S. Pat. No. 11,440,064, filed Feb. 14, 2020, Systems and Methods for Tank Cleaning.
Examiner's Requisition from the Canadian Intellectual Property Office in counterpart CA Pat. App. 3,073,030, Nov. 29, 2024 (4 pp.).

* cited by examiner

*Primary Examiner* — Andrew A Horton
(74) *Attorney, Agent, or Firm* — FisherBroyles, LLP

(57) ABSTRACT

A tank cleaning system for cleaning a space. The tank cleaning system can include a trailer having a support base transportable by a vehicle, and an arm movably mounted to the support base for movement relative to the support base. The arm can be operable to extend into the space to perform a cleaning operation inside the space.

19 Claims, 39 Drawing Sheets

SYSTEMS AND METHODS FOR TANK CLEANING

TECHNICAL FIELD

This disclosure relates generally to systems and methods for cleaning and refurbishment of tanks and other confined spaces utilizing robotic manipulator arms.

BACKGROUND

Tank cleaning is typically performed by a multi-person team which must enter the confined tank and wash it down manually. The team generally wears protective clothing and adheres to numerous safety precautions while inside the tank. Spotters external to the tank are sometimes required to monitor those inside. The manual tank cleaning process is labor intensive, time consuming, and costly. If tanks are not cleaned regularly, they can reach a point where they are no longer useable, and in extreme cases must be discarded or recycled, which is not cost effective.

SUMMARY

It is desirable to find an alternate solution that reduces the manual human-hours involved in cleaning frac tanks and other enclosures, and that does not require crew members to enter such structures, thereby improving safety, allowing the work to be performed remotely and by fewer people, and/or reducing operation costs.

In one aspect, the disclosure provides a cleaning system for cleaning a frac tank or other structure defining an interior space. The cleaning system includes a trailer having a support base transportable by a vehicle, and an arm movably mounted to the support base for movement relative to the support base. The arm is operable to extend into the space to perform a cleaning operation inside the space.

In another aspect, the disclosure provides a method of cleaning a frac tank or other structure having an interior space. The method includes positioning a trailer having a support base adjacent the space, wherein the trailer is transportable by a vehicle, and wherein the method further includes moving an arm movably mounted to the support base relative to the support base, extending the arm into the space, and performing a cleaning operation with the arm inside the space.

In yet another aspect, the disclosure provides a cleaning system for cleaning an enclosed space. The system includes an arm configured to perform a cleaning operation inside the space, and a boom operatively coupled to adjust a position of the arm. The arm may have a stowed configuration in which the arm is folded upon the boom such that the arm is side-by-side with the boom and parallel with the boom (or otherwise extends in a common direction with respect to the boom), and a deployed configuration in which the arm is unfolded in a different location.

In yet another aspect, the invention provides a cleaning system and method in which an arm is movable to different positions to dispense fluid supplied to the arm to different locations, wherein the location of the arm is adjustable via independent and different coarse and fine mechanisms. Other aspects of the invention will become apparent by consideration of the detailed description and accompanying drawings.

BRIEF DESCRIPTION OF THE DRAWINGS

A more complete understanding of the systems, methods, processes, and/or apparatuses disclosed herein may be derived by referring to the detailed description when considered in connection with the accompanying illustrative figures. In the figures, like-reference numbers refer to like elements or acts throughout the figures.

DETAILED DESCRIPTION

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Frac Tank Cleaning System

Figure 1:
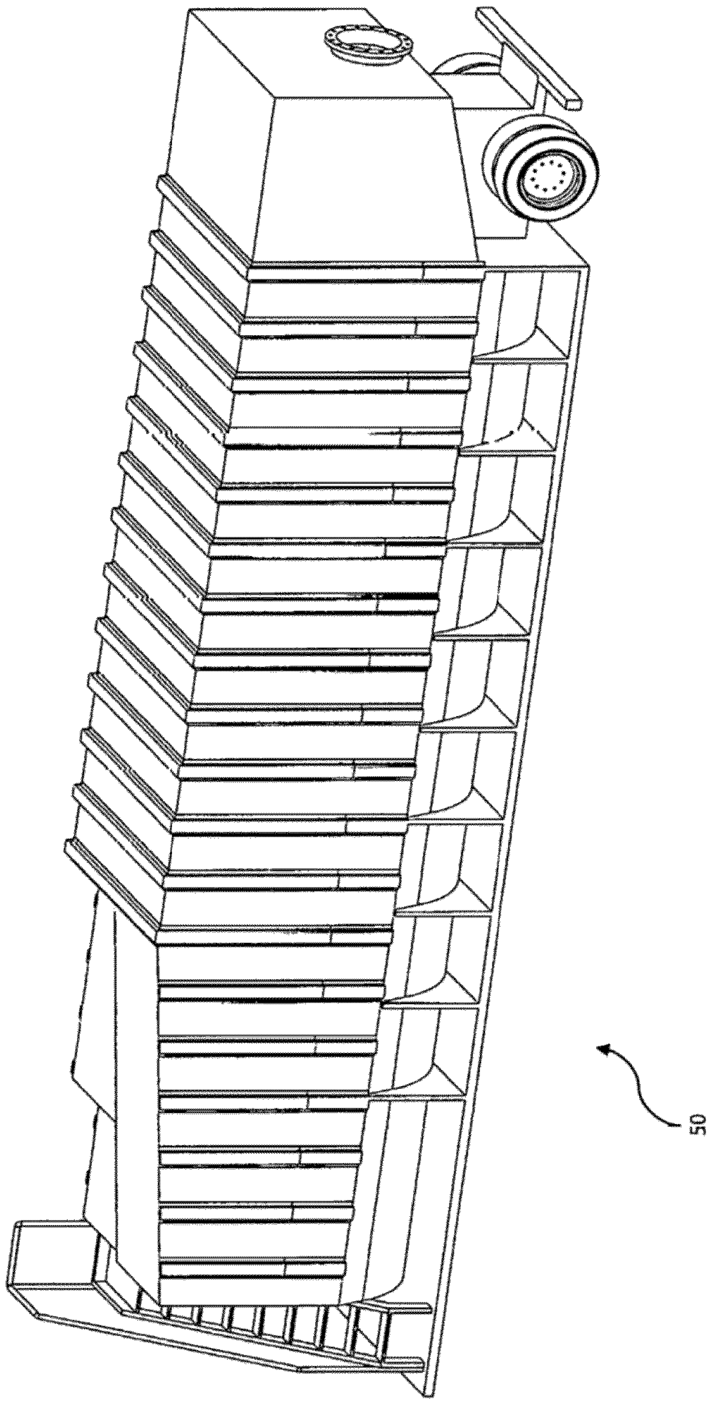
FIG. 1 illustrates a frac tank.

FIG. 1 illustrates a frac tank 50. Many industrial tanks, such as the frac tank 50, are holding tanks used to contain fluids such as run-off water, proppant, diesel fuel, and glycol, among others, for industrial use such as for chemical plants, refineries, oil fields, paper mills, wood products, and municipalities. Such tanks may be composed of steel and can be capable of containing 20,000 gallons of material(s). Other tank volumes are possible. In addition to heavy-gauge steel tanks, flexible tanks capable of holding over 200,000 gallons of fluid are possible. In some constructions, such tanks can be constructed of high strength urethane fabric, can have a high resistance to ultraviolet exposure, can be suitable for use in cold temperatures, and/or can be lighter than steel tanks.

The frac tank illustrated in FIG. 1 (by way of example) is one of many different types of large tanks used in various industries, any of which can be cleaned using the systems and methods described herein. Gas and oil industry well-drilling operations are the primary users of frac tanks. In an exemplary application, a frac tank may be filled with a drilling fluid containing salt water, acid, and pebbled mud, which is then pumped into a well to fracture the earth during a drilling operation. Most frac tanks have a specially designed, converging-pitch floor to ensure that fluid can be emptied regardless of the ground slope upon which a tank is supported. This design keeps the fluid from resting on the front wall of the tank, and can include a central low point accessible to an exit pipe. A vacuum pump (described in greater detail below) may be used to remove fluid from the frac tank, for example through the exit pipe. Those skilled in the art will recognize that often, when a tank is emptied, sediment may remain on the bottom of the tank, and residue may remain on the walls.

Figure 2B:
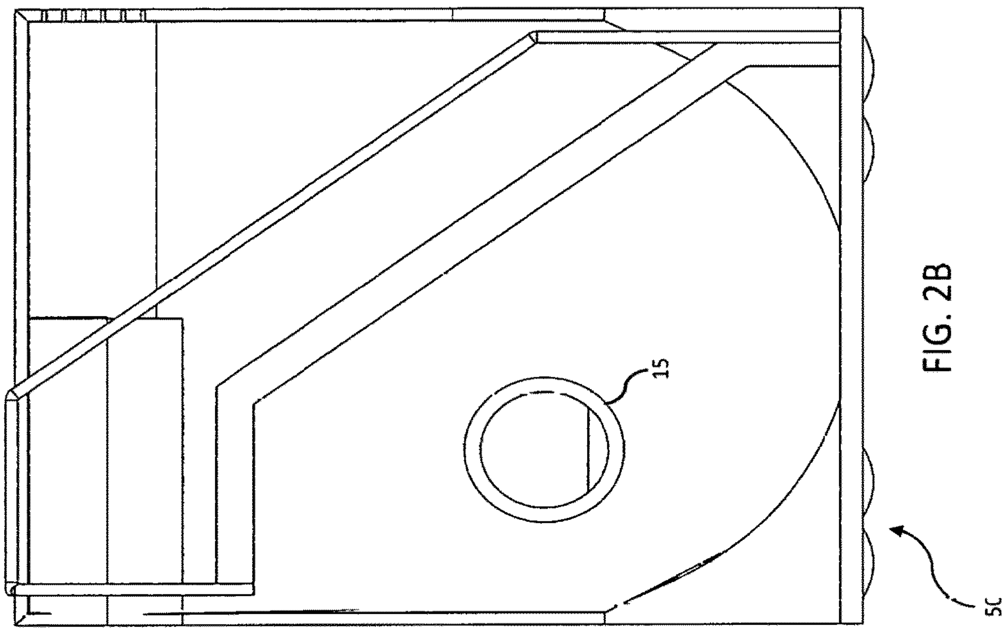
FIG. 2B illustrates the average manway location on a frac tank.
Figure 2A:
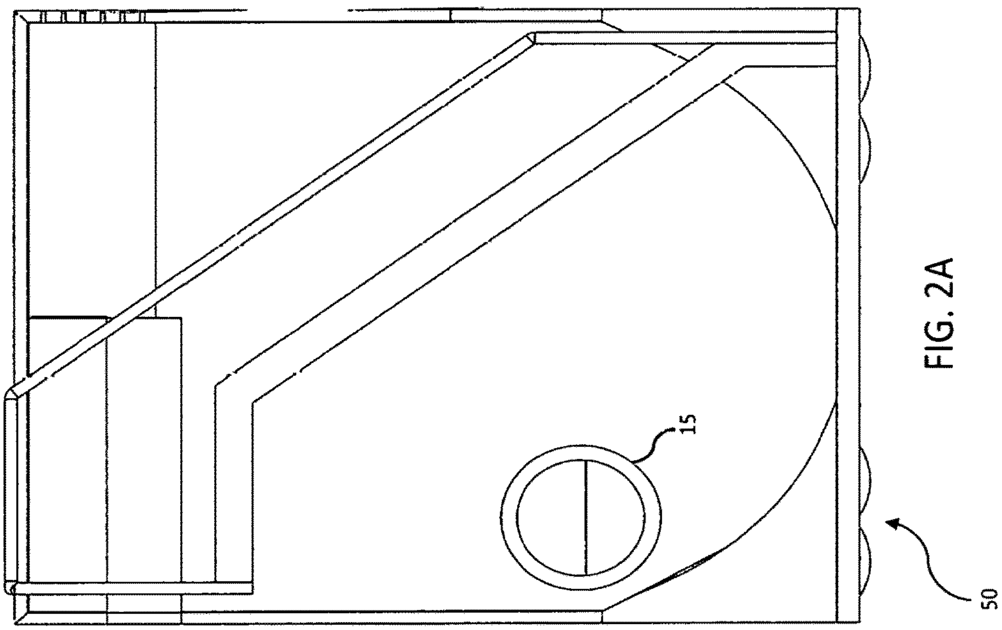
FIG. 2A illustrates a possible manway location on a frac tank.

FIGS. 2A and 2B illustrate possible manway 15 positions on frac tanks 50. FIG. 2A depicts a manway 15 position that shows the typical maximum offset from the average manway 15 position that is depicted in FIG. 2B. It will be appreciated that different access openings exist and are possible for different types of tanks, and that the manways 15 in the illustrated frac tanks of FIGS. 2A and 2B are presented by way of example only.

In an effort to reduce the need for workers to enter uncleaned environments or be within confined or difficult-to-reach spaces within tanks, a remotely operable tank cleaning system 100 is illustrated in FIGS. 3A-16D. The system 100 is referred to herein as a Frac Tank Cleaning System (FTS) only for purposes of description and by way of example in cleaning frac tanks. Accordingly, the various tank cleaning systems described and illustrated herein are not limited for use in cleaning frac tanks, and can be used for cleaning any tank having an interior space.

With continued reference to the Frac Tank Cleaning Systems 100 of FIGS. 3A-16D, the illustrated systems each include a manipulator arm 300, an extension boom 200, a control system 400, and one or more end effectors 350 that may be remotely deployed. The FTS 100 may be used to remotely inspect, maintain, and clean confined spaces, such as the frac tank 50 or any other confined space, with little to no human interaction required.

The terms "tank", "frac tank", "workspace", "confined space", "space", and other references to the space or area in which the FTS 100 operates, as used herein, are interchangeable, are merely used herein to reference a space within which the FTS 100 may perform operations, and are not intended as being limiting. The FTS 100 may perform operations in any confined space in which the FTS 100 can be positioned, including horizontal insertions into the tank as illustrated herein, vertical insertions, and any combination of such insertions. Similarly, the terms "manway", "opening", "entry" and the like are merely used to indicate any opening through which the FTS 100 may be inserted, and are not intended as being limiting.

Figure 3A:
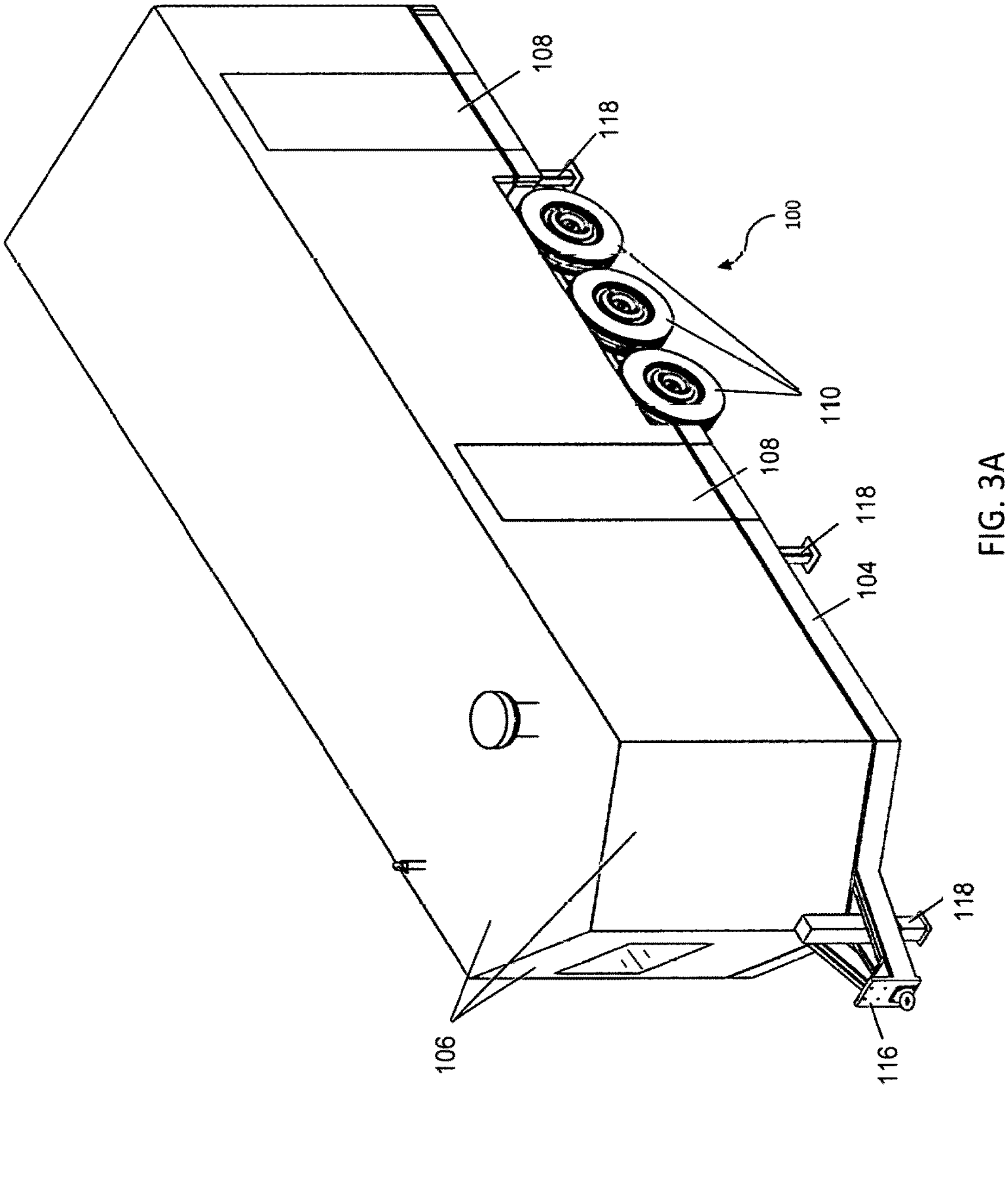
FIG. 3A is a perspective view of a portable Frac Tank Cleaning System (FTS).
Figure 3B:
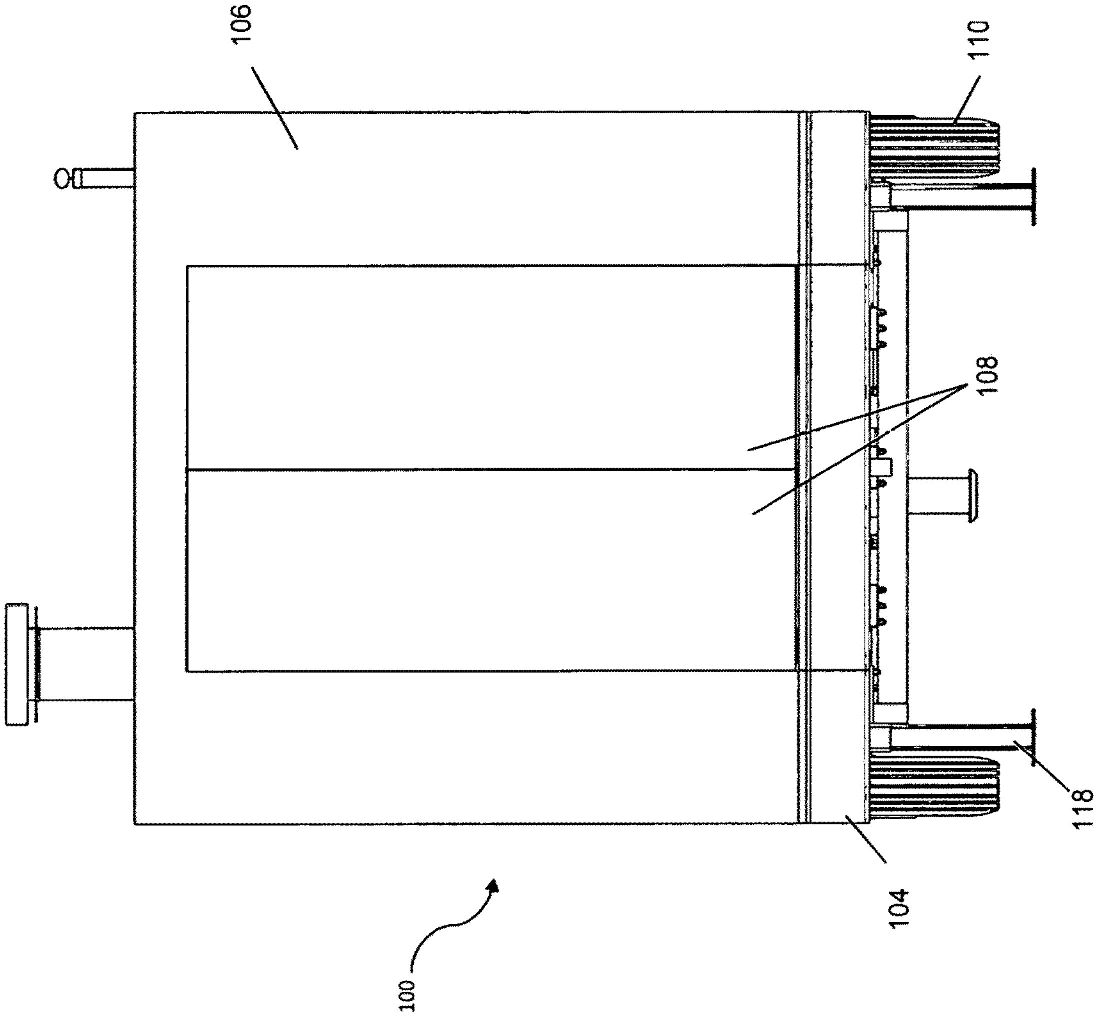
FIG. 3B is a rear view of the portable FTS of FIG. 3A.

FIG. 3A is a perspective view of one embodiment of the portable FTS 100. In the illustrated embodiment, the FTS 100 is built onto, or supported by, a mobile trailer 104 with a flat horizontal support base having wheels 110 that may be hitched to a truck 190 (e.g., see, for example, FIGS. 4F and 11) or other vehicle by way of a hitch 116 for easy relocation and repositioning. The trailer 104 has supports 118, which may be extendable and retractable by hydraulic cylinders, servo-motors, or other suitable actuators. Suitable supports 118 can be driven to extend and retract vertically, horizontally, or both vertically and horizontally to raise and lower the trailer 104 with respect to the ground surface and/or to laterally shift the position of the trailer 104 with respect to the ground surface. In doing so, the supports 118 can extend and widen support and/or raise the trailer 104 towards and away from the ground. In some embodiments, the trailer 104 may be covered and/or insulated by walls 106. The trailer 104 may have multiple doors 108 for crew entry and equipment access. FIG. 3B is a rear view of the portable FTS 100 illustrating rear access doors 108. In the embodiment illustrated in FIGS. 4E-4I, which will be described in greater detail below, the trailer 104 is not covered or insulated, i.e., does not have walls. In other embodiments, the walls 106 of the trailer 104 may be collapsible, e.g., by way of hinges or by rotatable, foldable, movable, or removable couplings, or may be foldable or rollable such as by way of an accordion wall or cover.

Figure 4A:
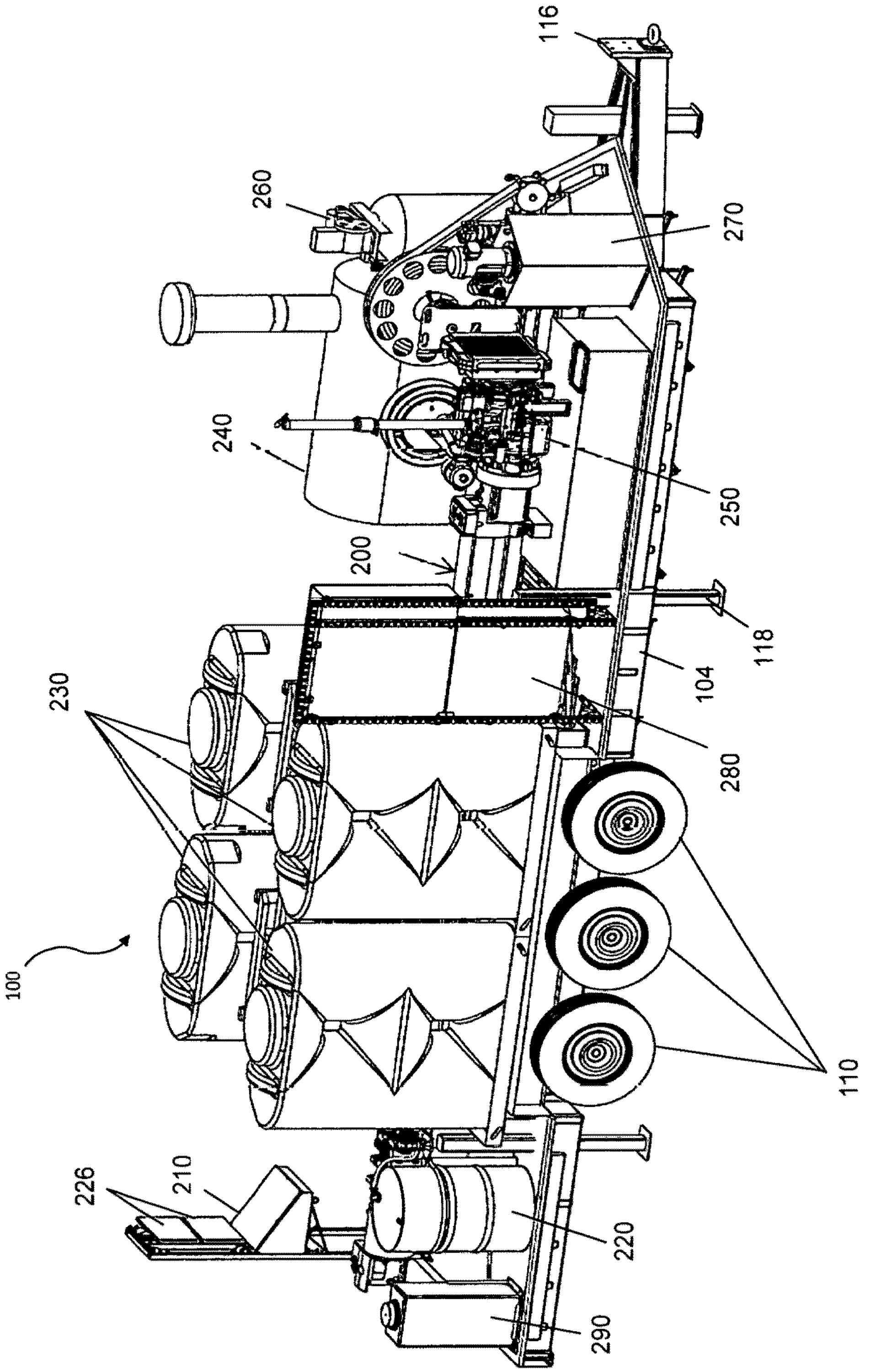
FIG. 4A is a view of the portable FTS with the exterior walls of the FTS removed to display the interior components.
Figure 4B:
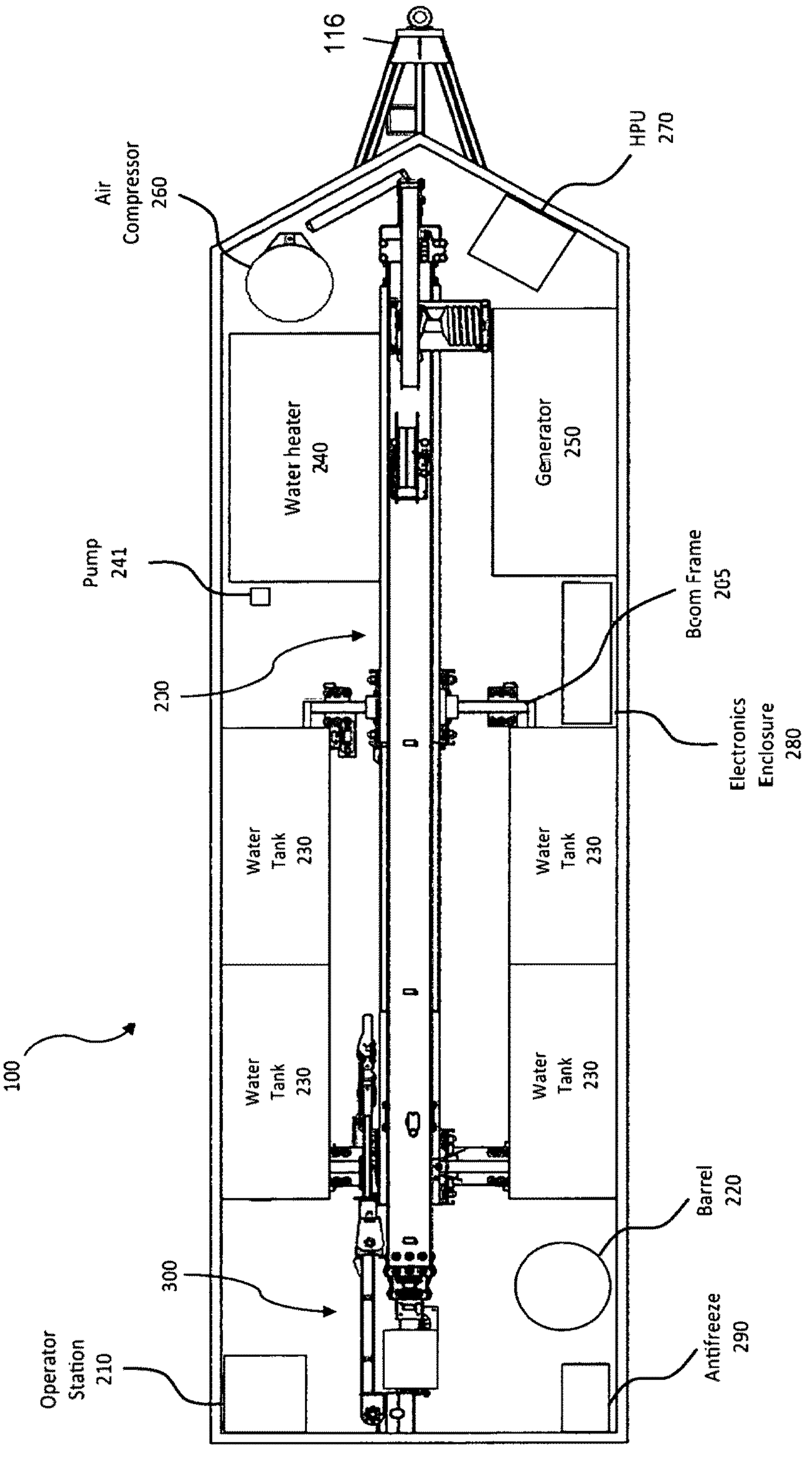
FIG. 4B is a top view of the portable FTS of FIG. 4A.

FIGS. 4A and 4B illustrate the internal components of the mobile FTS 100 according to one embodiment. In the illustrated embodiment, the FTS 100 includes a manipulator arm 300, extension boom 200, boom frame 205 (FIG. 4B), operator station 210, degreaser barrel 220, one or more water tanks 230, a water heater 240, a pump 241 (FIG. 4B), a generator 250, an air compressor 260, a hydraulic power unit (HPU) 270, an electronics enclosure 280, and an antifreeze container 290. In the illustrated embodiment, the pump 241 (FIG. 4B) is external to the water heater 240. However, the pump 241 may be internal to or integral with the water heater 240, and other pump 241 placements are possible.

Figure 4C:
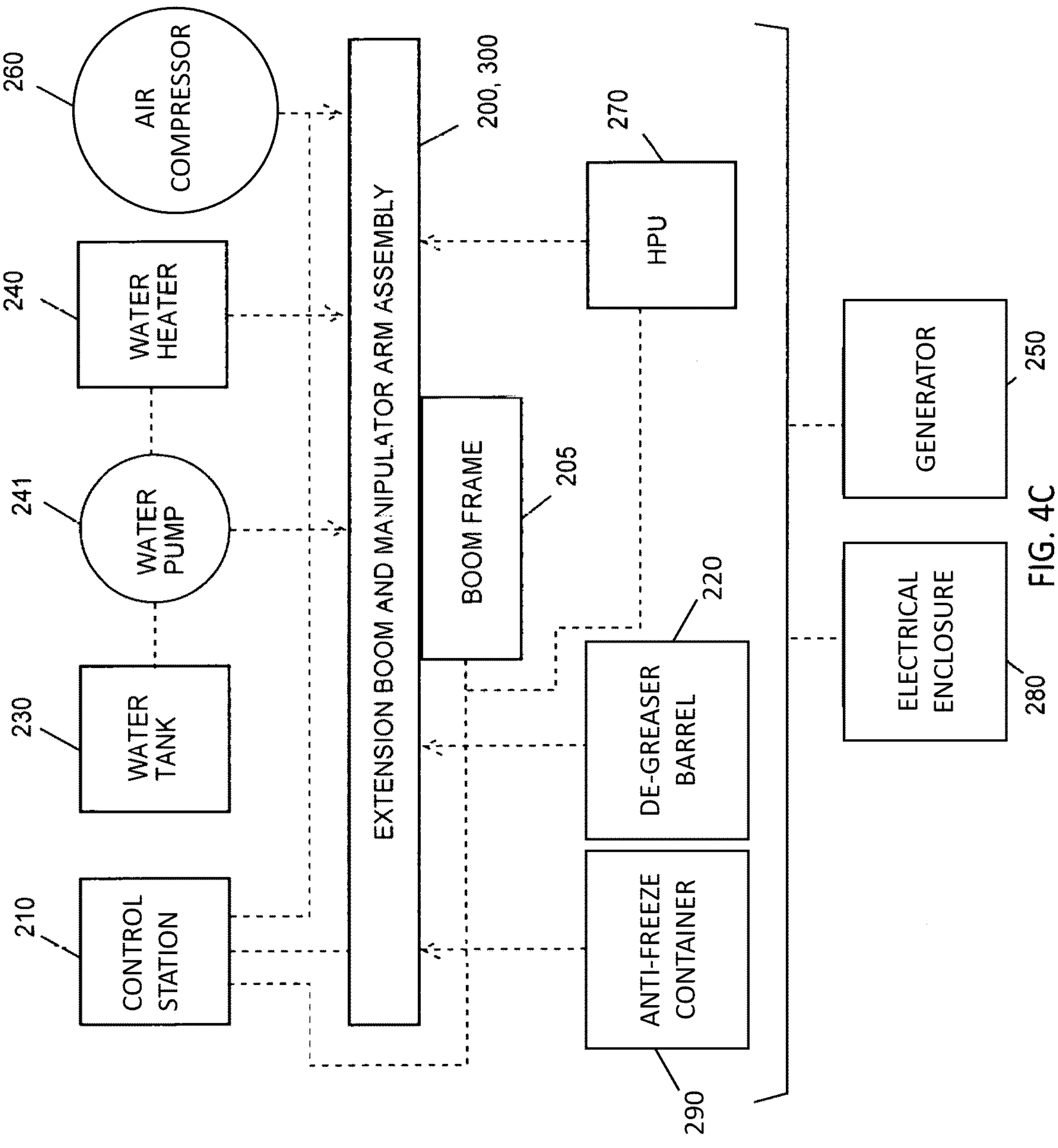
FIG. 4C is a schematic diagram of the portable FTS of FIG. 4B.
Figure 4D:
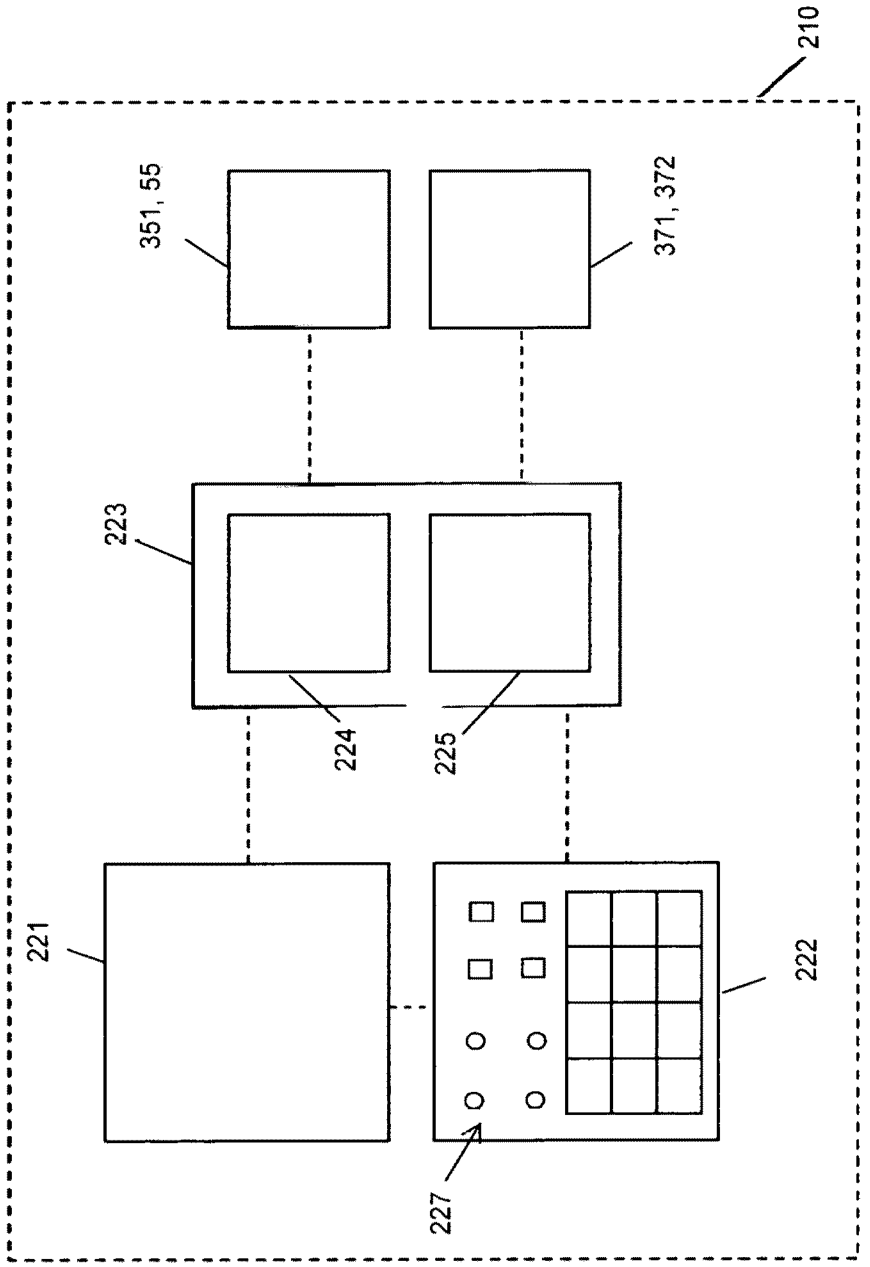
FIG. 4D is a schematic diagram of a control station of the portable FTS of FIG. 4A.
Figure 4E:
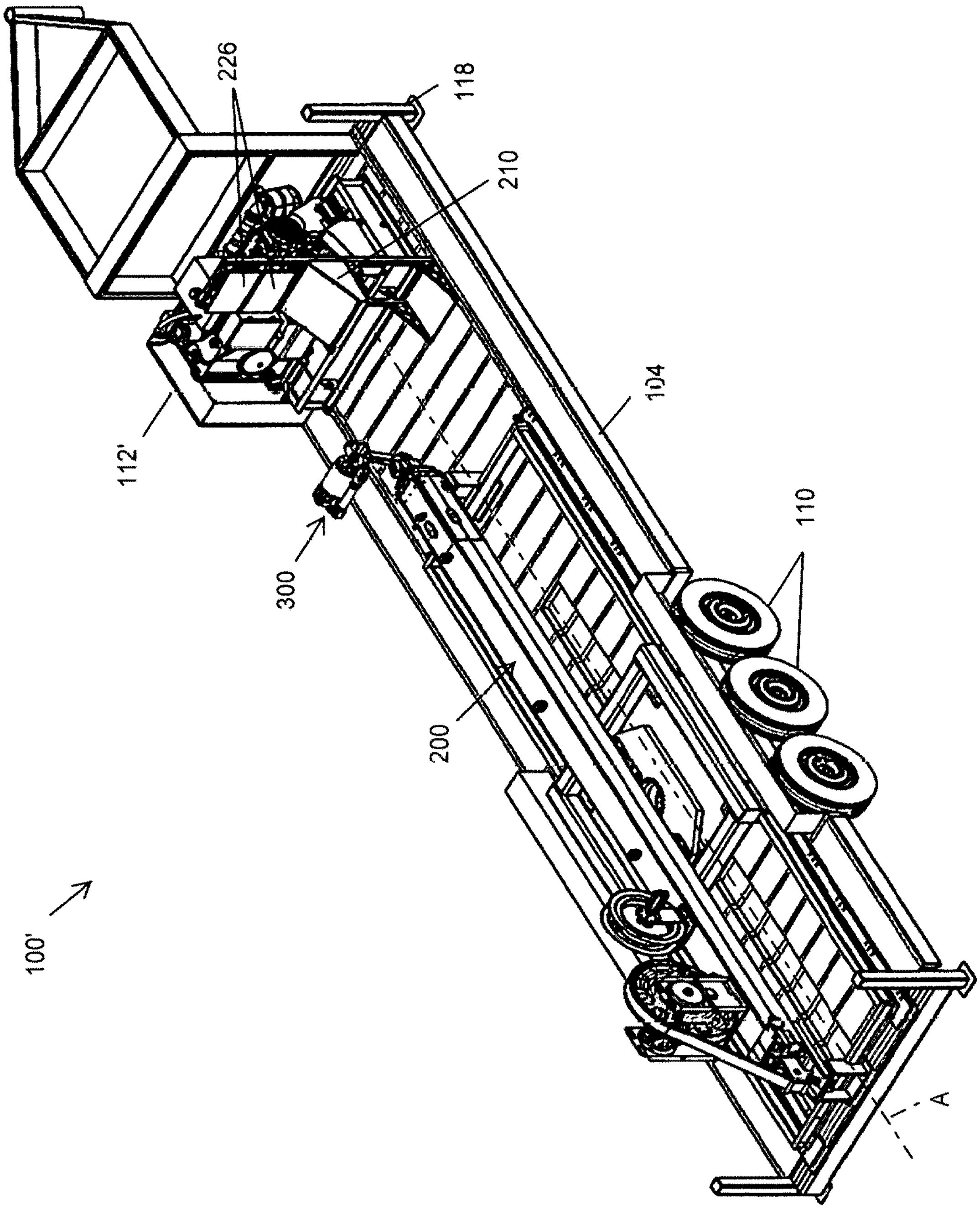
FIG. 4E is a perspective view of another embodiment of a portable FTS.

FIG. 4C schematically illustrates the internal components of the illustrated FTS 100, and the operative couplings between the internal components. With reference to FIGS. 4A-4C, in the illustrated embodiment the pump 241 is operatively coupled to the water heater 240 for drawing water received from the water tanks 230 (or another water source fluidly coupled to the water pump 241) and delivering the water to water heater 240. Alternatively or in addition, the water drawn by the water pump 241 can be delivered directly to the manipulator arm 300 (i.e., without being heated). In either case, the water pump 241 is directly or indirectly coupled to the one or more water lines extending along the extension boom 200 and manipulator arm 300, which in some embodiments receives water from the water pump 241 in pressurized form. Water supplied to the extension boom 200 and manipulator arm 300 can be used to create a high pressure stream exiting at a nozzle 355 at an end effector 350 (illustrated in FIG. 7A and described in greater detail below) for cleaning the tank 50. In some embodiments, the water heater 240 may contain water at any possible desired water temperature, hot or cold.

The extension boom 200 may include a hydraulic cylinder, a motor such as a servo-motor, telescoping arms (which are shown and described in greater detail below), and/or other axially adjustable components to enable the extension boom 200 to extend into a tank 50 for positioning the manipulator arm 300 during operations. In the illustrated embodiments of FIGS. 4A-4I, the boom frame 205 allows for horizontal adjustment (parallel to the ground) of the extension boom 200 (and therefore also the manipulator arm 300) in a Y-direction transverse to a longitudinal axis A of the trailer 104 (see FIG. 4B). The boom frame 205 can be secured to the floor of the FTS 100, and can include tracks, rails, and the like along which the extension boom 200 can roll, glide, or otherwise travel to adjust the position of the extension boom 200 in the Y-direction as just described. In some embodiments, the boom frame 205 allows for other horizontal (e.g., X-direction), vertical (e.g., Z-direction shown in FIG. 4F), and/or rotational movement of the extension boom 200 and manipulator arm 300, e.g., as illustrated in the embodiment of FIGS. 4C-4H and as will be described in greater detail below. The boom frame 205 may be movable manually (e.g., by pushing, pulling, or rotating the extension boom 200 and manipulator arm 300 to different positions along the boom frame 205), by manual adjustment of mechanical fasteners (not shown) to push, pull, and/or rotate the extension boom 200 and manipulator arm 300 relative to the boom frame 205, by one or more motors, servo-motors, hydraulic or pneumatic cylinders, or other actuators (not shown) connected to the extension boom 200 to push, pull, and/or rotate the extension boom 200 and manipulator arm 300 to different positions on the boom frame 205, and the like. Embodiments of manipulator arms 300 that are movable by one or more actuators can be controlled electronically (e.g., by way of the operator station 210). For example, servo-motors used for moving the extension boom 200 and manipulator arm 300 may include one or more sensors for position feedback.

The operator station 210 in the illustrated embodiments is a control station operatively connected to the manipulator arm 300, which may be used by an operator to manually control the manipulator arm 300 during processing and/or to monitor pre-programmed automated operations. The operator station 210 may also be operatively coupled to control other components of the FTS 100, such as the water pump 241, the water heater 240, the air compressor 260, the anti-freeze container 290, the degreaser barrel 220, the boom frame 205, and/or the hydraulic power unit 270. As illustrated further in FIG. 4D, the control station 210 includes a human-machine interface including a display 221, a user interface 222, and a control unit 223 having a processor 224 and a memory 225. In the illustrated construction, the display 221 includes two display screens 226 (FIG. 4A), such as liquid crystal display (LCD) screens, light-emitting-diode (LED) screens, or other suitable visual display screens. However, in other embodiments, the display 221 may include one, three, or more screens 226. In the illustrated embodiment, the user interface 222 includes one or more input actuators 227, such as buttons, levers, knobs, hand cranks, joy sticks, a keyboard, a mouse, etc. In other constructions, the control station 210 may include a graphical user interface (GUI) or other types of interfaces that allow the control unit 223 to communicate with the operator, and for the operator to communicate with the control unit 223, such as a touch screen, a display with other types of actuators, audio, voice recognition, visual position recognition, etc. The control unit 223 can be configured to receive signals from cameras 351, 55 and/or sensors 371, 372 (which will be described in greater detail below), and may save or record the signals into the memory 225. The control unit 223 is also configured to send control signals to the extension boom 200 and the manipulator arm 300 for controlling the movements thereof. The control unit 223 may include a program or algorithm configured to automatically control the extension boom 200 and the manipulator arm 300 based at least in part upon signals received from the cameras 351, 55 and/or the sensors 371, 372. The control unit 223 may additionally or alternatively be configured to allow the operator to manually control the extension boom 200 and the manipulator arm 300 by way of the user interface 222. Also, the signals received from the cameras 351, 55 (e.g., video) and the sensors 371, 372 may be displayed on the display 221 for providing feedback to the operator.

Returning to FIG. 4C, the degreaser barrel 220 may contain a liquid degreaser or other cleaning agent that may be operatively coupled to the manipulator arm 300 for being sprayed on inner surfaces of the tank 50 to clean residues thereon. The water tank or tanks 230 contain water, and are operatively coupled to the manipulator arm 300 to be used for pressure washing. The water heater 240 may optionally be used to heat the water prior to pressure washing. The generator 250 generates electricity to provide power to the equipment in the FTS 100, and thus can be operatively (e.g., electrically) coupled to the operator station 210, water heater 240, pump 241, the extension boom 200 (if powered by a motor or other electrically-powered actuator), the boom frame 205 (again, if powered by a motor or other electrically-powered actuator), the air compressor 260, the hydraulic power unit 270, the electronics in the electronics enclosure 280, the manipulator arm 300, and the like. The air compressor 260 is operatively coupled to the manipulator arm 300 to provide compressed air that may be directed at the viewing camera lens or lenses (e.g., camera(s) 351, which will be described in greater detail below) to remove debris therefrom for operation. The HPU 270 is used to pressurize hydraulic fluid for the FTS 100, and is operatively coupled to control motion of the extension boom 200 and/or manipulator arm 300. The electronics enclosure 280 houses at least some of the major electronics, and may be operatively (e.g., electrically) coupled to the operator station 210, the pump 241, the air compressor 260, the extension boom 200, and/or the manipulator arm 300 (and its components, which will be described in greater detail below). The antifreeze container 290 contains antifreeze or any other type of liquid used to inhibit susceptible components from freezing during storage. In some embodiments, antifreeze or coolant may be used during operation of the FTS 100.

In some embodiments, one or more of the components of the FTS 100 described herein may include the following examples: the generator 250 may be a 208 VAC three phase diesel generator, the water heater 240 and pump 241 may provide 10 GPM (3000 psi, 38 LPM, 20682 kPa) hot pressurized water, the hydraulic power unit 270 may have a capacity of 40 gallons (151 liters), the water tanks 230 may include two large water tanks (368 gallons each, 736 gallons total or 1393 liters each, 2786 liters total), the degreaser barrel 220 may hold 55 gallons (208 liters), and the air compressor 260 may have a capacity of 30 gallons (114 liters). These values are presented by way of example only. Other sizes and types of equipment may be used.

FIGS. 4E-4I illustrate an alternative embodiment of the FTS 100'. Only the differences between the FTS 100' and the FTS 100 need be described herein, and all other description of the FTS 100 should be construed as being included in the FTS 100'. The FTS 100' includes the trailer 104 having wheels 110 and supports 118, but has no walls 106 or doors 108. In some embodiments, the FTS 100' includes the extension boom 200, the manipulator arm 300, the HPU 270, the electronics enclosure 280, and the operator station 210, but may not include the degreaser barrel 220, the water tanks 230, the water heater 240, the pump 241, the generator 250, the air compressor 260, and/or the antifreeze container 290. However, any combination of one or more of these components providing services such as water supply, water heating, water pressure, electricity, hydraulic power, pressurized air, degreaser, antifreeze, etc., may be provided externally. For example, the degreaser barrel 220, water tanks 230, water heater 240, pump 241, generator 250, air compressor 260, HPU 270, and/or antifreeze container 290 (in any combination of one or more) may be provided externally on an auxiliary trailer, vehicle, building, structure, etc. (not shown) coupled to the FTS 100'. Alternatively or additionally, any one or more of the services may be provided externally by a utility source, e.g., by way of cables, hoses, etc. (not shown) coupled to the FTS 100'. The FTS 100' may include a manifold 112' for receiving and coupling the services to the FTS 100'.

Figure 4F:
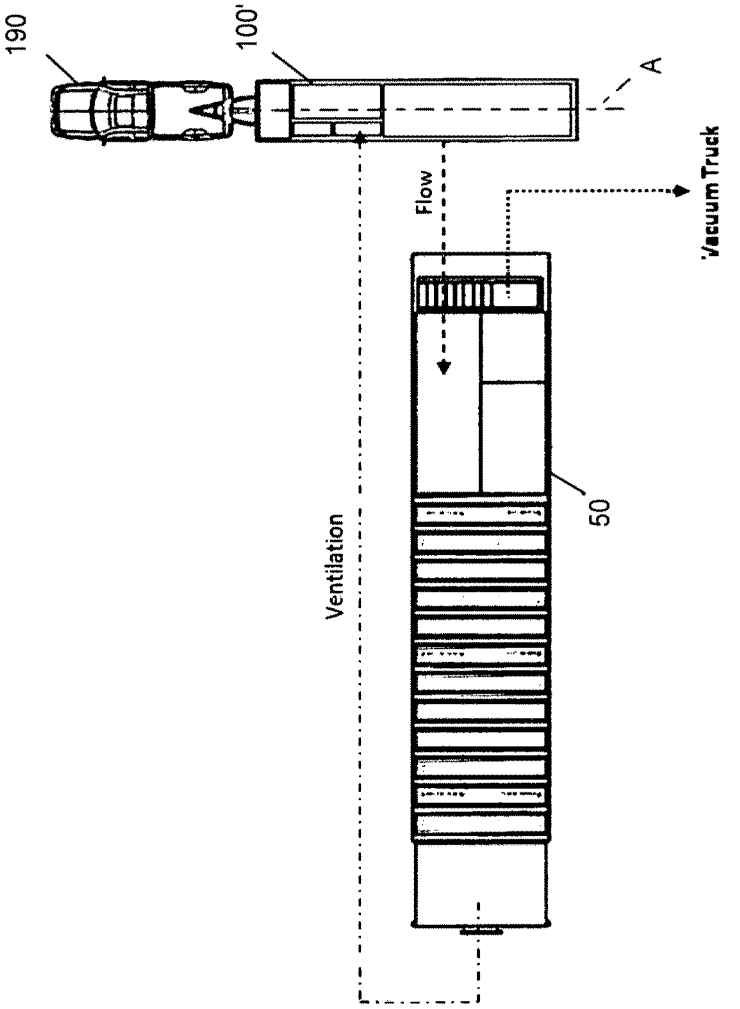
FIG. 4F is a top view of the portable FTS of FIG. 4E, shown adjacent the frac tank of FIG. 1.
Figure 4G:
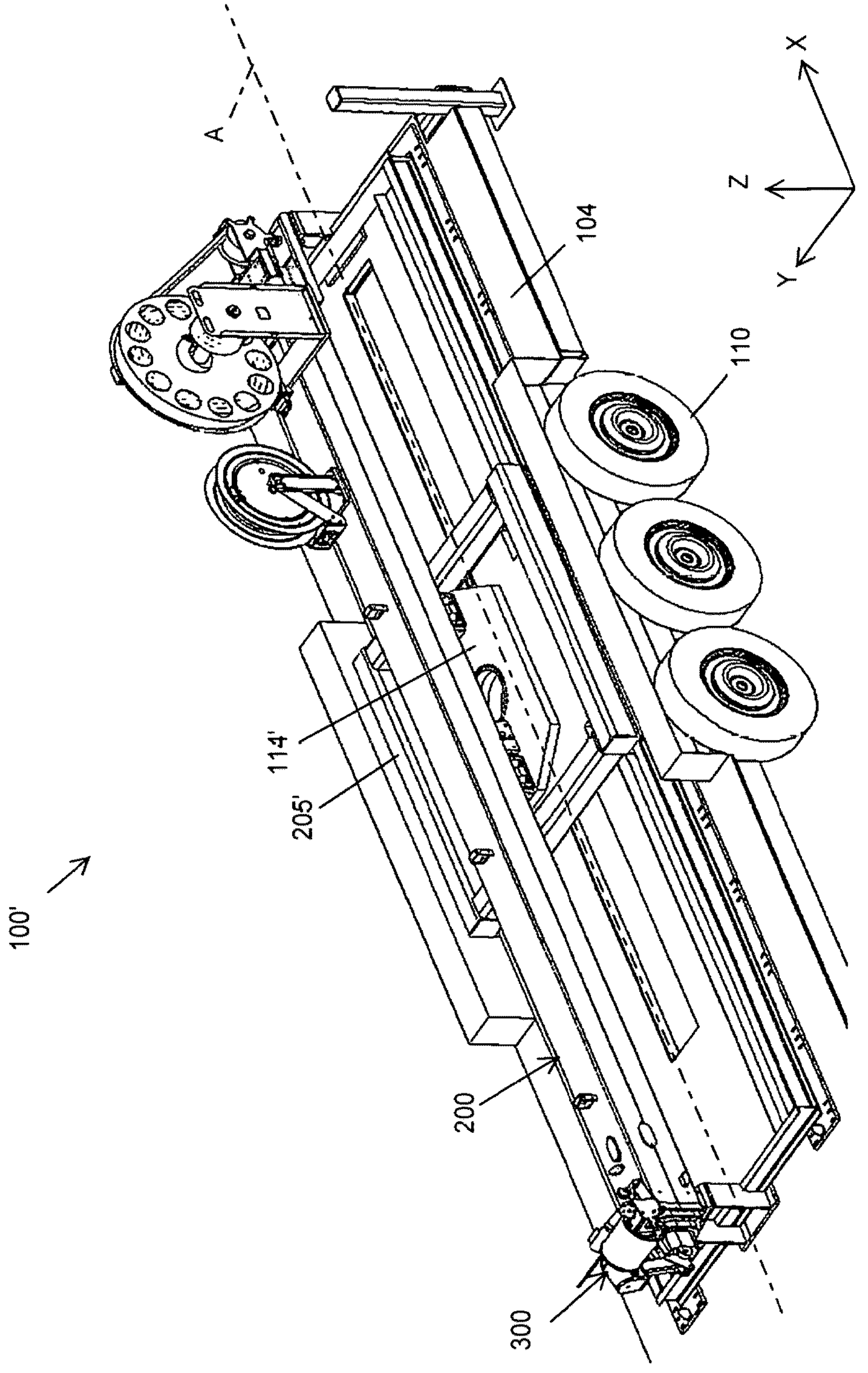
FIG. 4G is another perspective view of a portion of the portable FTS of FIG. 4E.

Reduction of services supported directly on the trailer 104 reduces weight on the trailer 104 and increases space around the extension boom 200 and manipulator arm 300 for increased freedom of movement thereof. For example, as illustrated in FIG. 4F, the frac tank 50 may be disposed in a hard-to-reach location with limited space adjacent the manway 15, in which case the trailer 104 may be more easily parked, by the truck 190, in an orientation with the longitudinal axis A transverse, or more specifically generally perpendicular, to the frac tank 50. In such cases, it may be advantageous to have the free space on the FTS 100' to rotate the extension boom 200, e.g., by 90 degrees, to align with the manway 15.

As such, the FTS 100' in the embodiment of FIGS. 4E-4I also includes a boom frame 205' (FIG. 4G) providing longitudinal travel in the X-direction (e.g., by way of manual adjustment, or motorized, hydraulic, or pneumatic actuators coupled to the extension boom 200 and positioned to move the extension boom 200 along the boom frame 205' in any of the manners described above). In the illustrated embodiment of FIGS. 4E-4I, the boom frame 205' is not adapted for transverse movement of the extension boom 200 along the Y-direction. However, other embodiments may include such directional travel in both X and Y directions by supporting the extension boom 200 for rolling, sliding, or other movement upon a first boom frame 205 in one direction (e.g., the Y direction), and by also supporting the extension boom 200 and/or the first boom frame 205 for rolling, sliding or other movement upon a second boom frame 205' adapted for movement in another direction (e.g., the X direction).

Figure 4H:
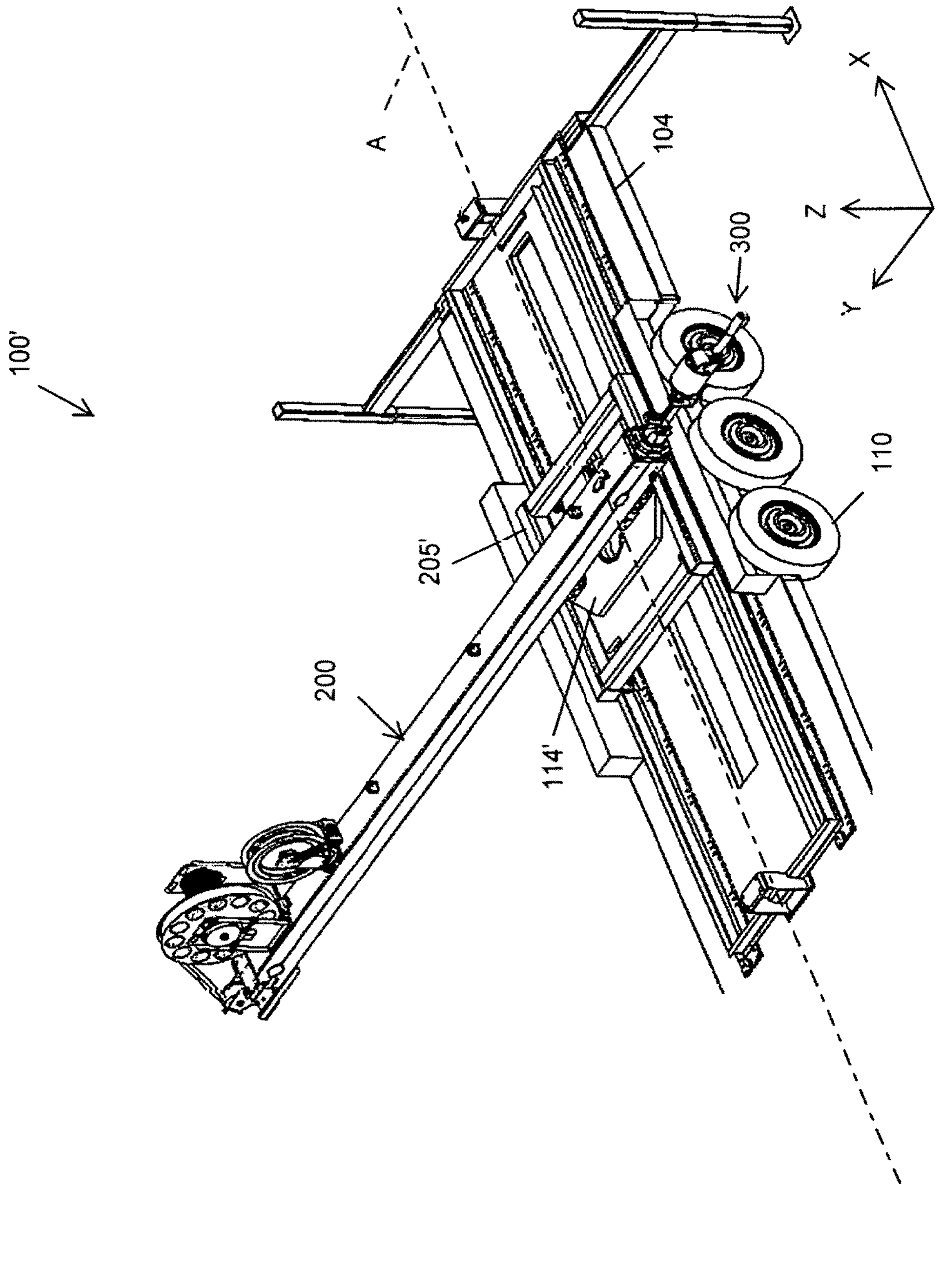
FIG. 4H is another perspective view of a portion of the portable FTS of FIG. 4E.
Figure 4I:
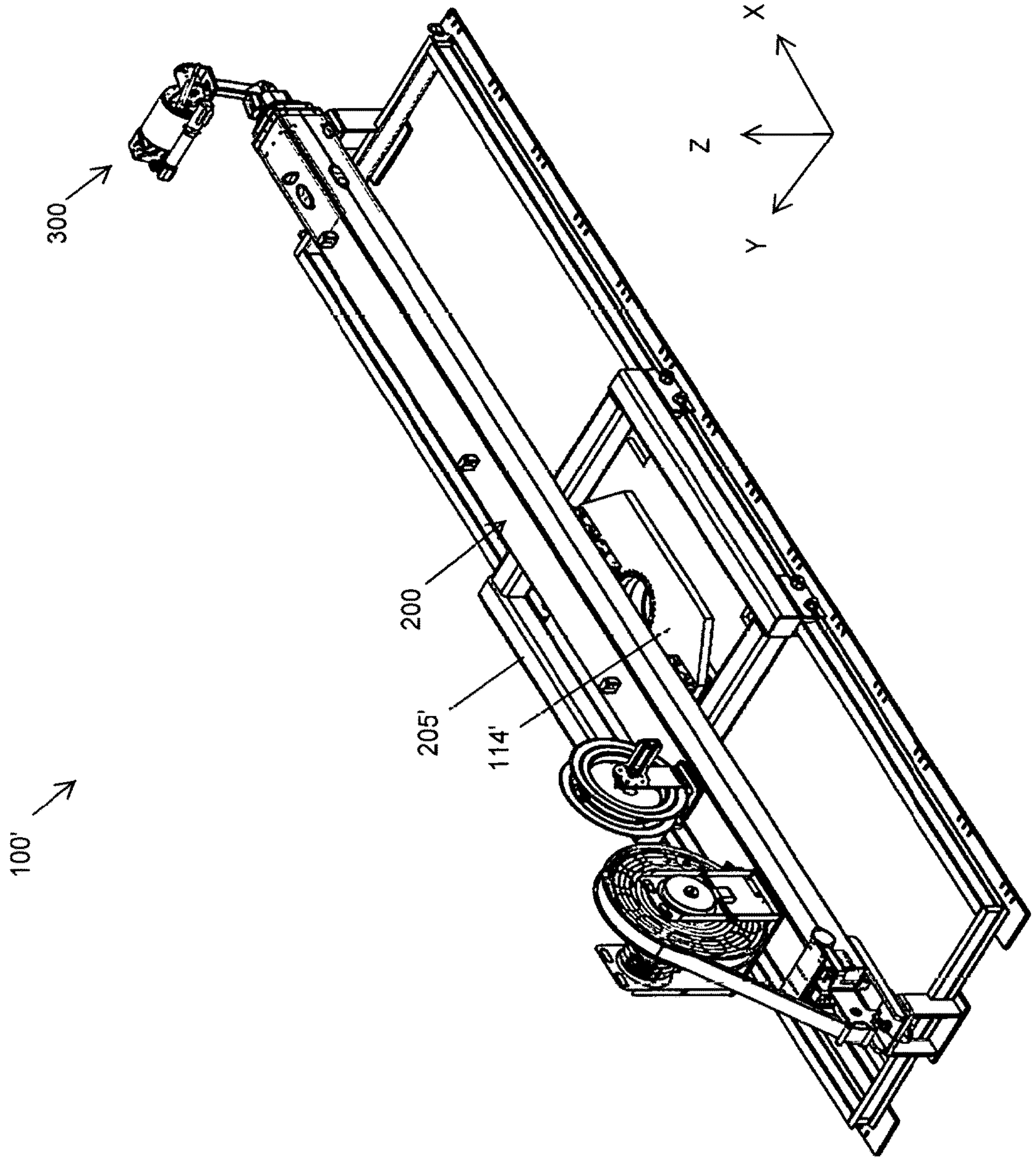
FIG. 4I is another perspective view of a portion of the portable FTS of FIG. 4E.

In some embodiments, such as in the illustrated embodiment of FIGS. 4E-4I, the extension boom 200 is mounted for rotational movement with respect to the rest of the FTS 100', such as upon a slewing bearing 114'. As illustrated in FIG. 4H by way of example only, the slewing bearing 114', and thus the extension boom 200 and manipulator arm 300, can be rotated 90 degrees with respect to the longitudinal axis A of the FTS 100'. The slewing bearing 114' may have a range of motion of at least 180 degrees, or in other embodiments may be continuously rotatable (e.g., 360 degrees or more). For example FIG. 4I illustrates the slewing bearing 114' rotated 180 degrees with respect to the position shown in FIG. 4G.

In some embodiments, the FTS system and all or part of the required previously described componentry may be mounted permanently or semi-permanently to one or more of the ground, a fixed platform or other fixed substrate, a movable non-wheeled substrate, and a suspended substrate.

Figure 5A:
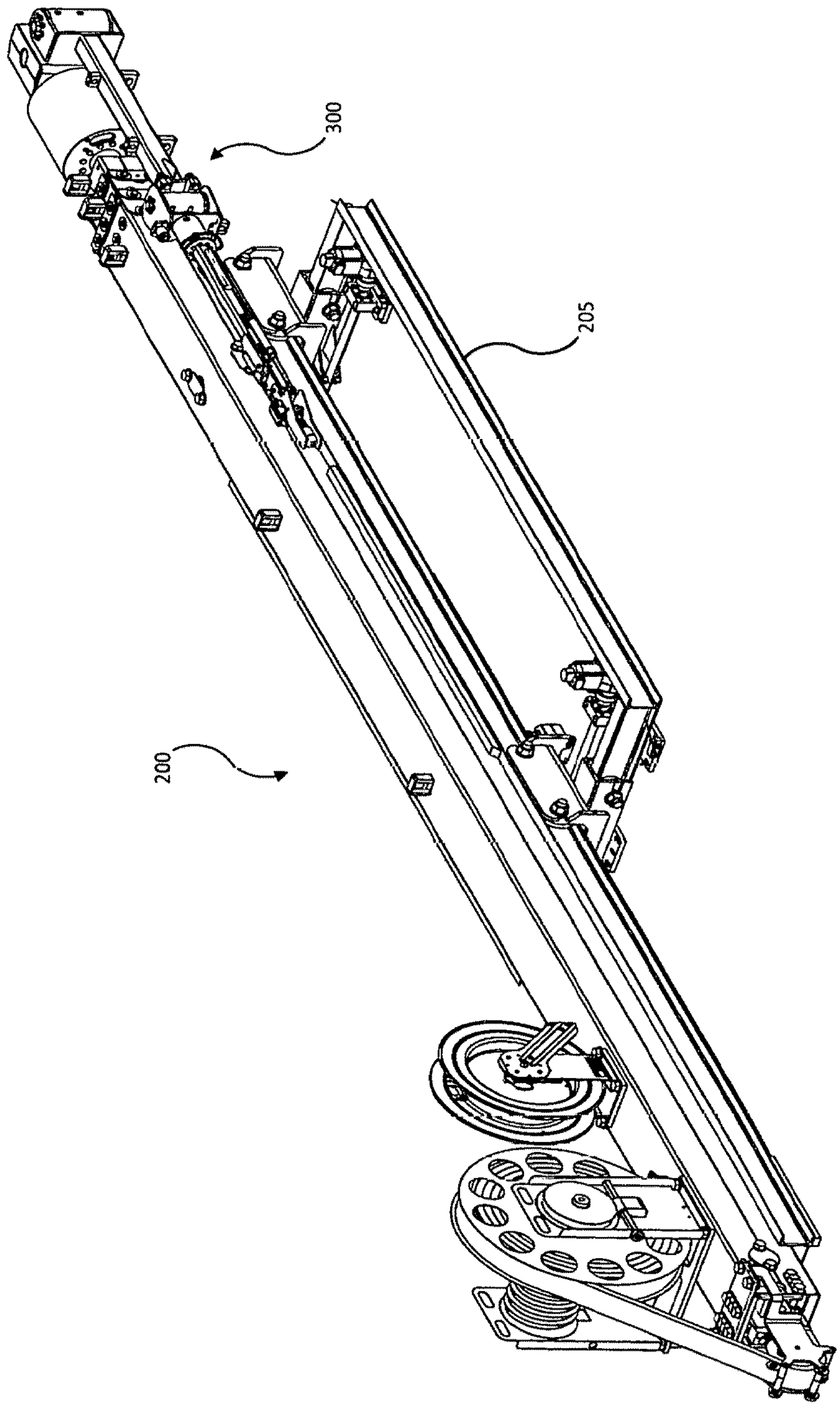
FIG. 5A is a perspective view of an extension boom and manipulator arm of the FTS of FIG. 4A or 4E.
Figure 5B:
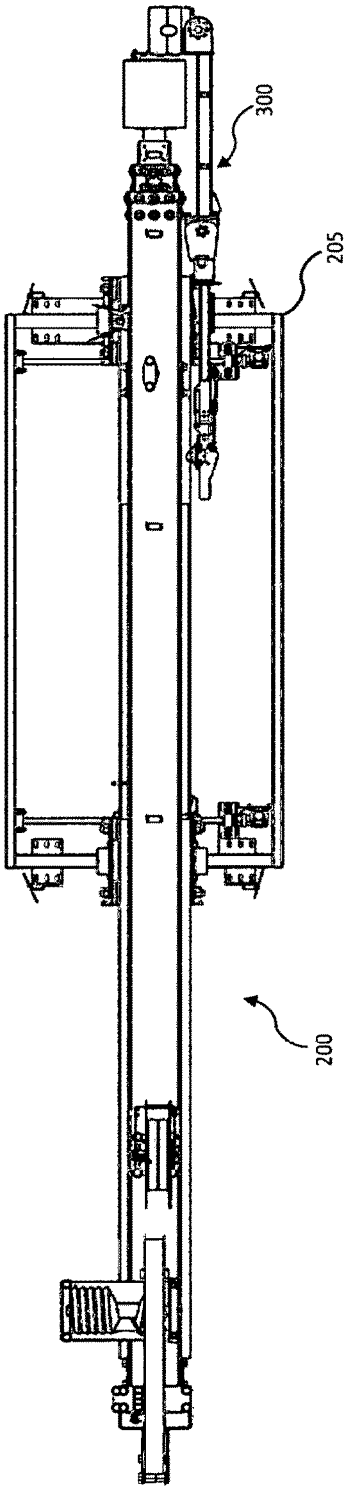
FIG. 5B is a top view of the extension boom and manipulator arm of FIG. 5A.

FIG. 5A is a perspective view of the extension boom 200 and manipulator arm 300 which are employed with the FTS 100 and the FTS 100'. FIG. 5B illustrates a top view of the extension boom 200 and manipulator arm 300 of FIG. 5A. During transport and insertion into a tank 50, the manipulator arm 300 may be disposed in a stowed configuration (FIG. 5B), e.g., folded or otherwise move to a position along the side of the extension boom 200 (e.g., folded back and alongside the extension boom). In such a position and orientation, the manipulator arm 300 and extension boom can be side-by-side and either parallel or extending generally in a common direction with respect to the extension boom 200 as illustrated. In some embodiments, the extension boom 200 and manipulator arm 300 assembly may be inserted through a manway 15 as small as twenty inches in diameter, although this diameter is not intended as a limitation, and other manway entry-diameters are possible. The extension boom 200 may be extended into the tank 50 for subsequent deployment therein. More specifically, the manipulator arm 300 may then be unfolded from the extension boom 200 within the interior space of the tank 50, or may otherwise be moved from the stowed position beside the extension boom as described above after insertion. An example of this deployment is shown in FIGS. 7A-7B) in which the manipulator arm 300 is extended from the extension boom 200 to no longer be side-by-side or otherwise beside the extension boom 200, but rather to be in a position at least partially in front of the extension boom 200.

Figure 6:
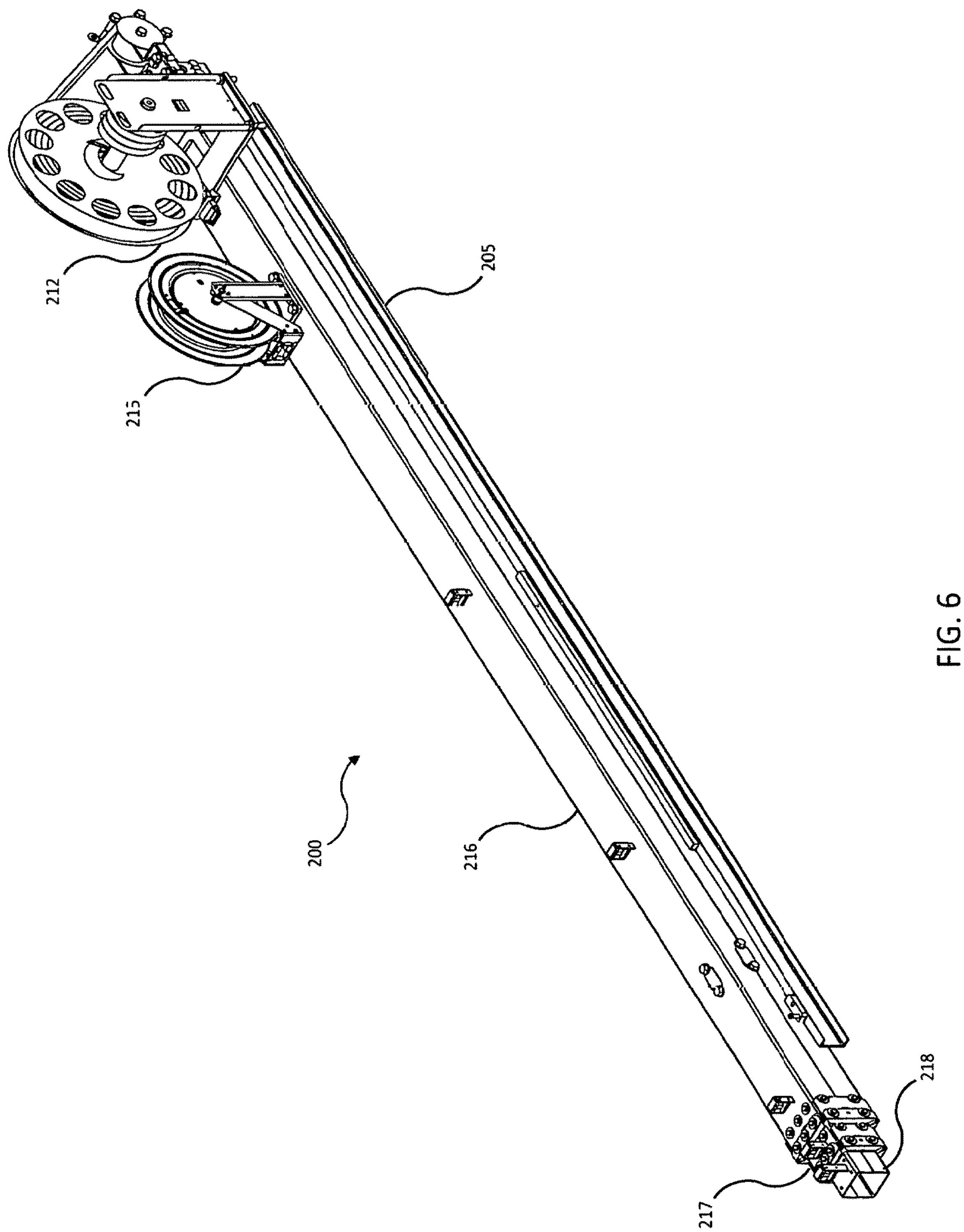
FIG. 6 is a perspective view of the extension boom of FIGS. 5A and 5B.

FIG. 6 illustrates a perspective view of an extension boom 200 according to some embodiment. In some embodiments, the boom frame 205, 205' may be adjustable as discussed above to allow for precise alignment of the extension boom 200 and manipulator arm 300 with respect to the manway 15 of a frac tank 50. The adjustable boom frame 205, 205' may allow the manipulator arm 300 to move vertically, horizontally, and/or to rotate in a horizontal plane (as discussed above). Such movement enables the extension boom 200 and manipulator arm 300 to be aligned with respect to the position and orientation of the manway 15, and the orientation of the frac tank 50. In some embodiments, the boom frame 205, 205' may also allow the entire boom 300 and arm assembly 200 to translate in the X-direction (up to ten feet in some embodiments), allowing the boom 200 to be inserted into the tank 50 without preemptively extending the boom 300. Also, in some embodiments the boom 300 includes two or more extendable telescoping boom sections 216, 217, 218. In some embodiments, each boom section 216, 217, 218 may extend up to 17.5 feet, although this extension length is not intended as a limitation, and other extension lengths are possible. In some embodiments, cable management reels 212 and 215 are used to manage hydraulic lines and water hoses, respectively, and to inhibit the lines from becoming kinked or caught during boom 200 extension and retraction. In some embodiments, the hydraulic lines may fluidly and operatively couple the HPU 270 to the extension boom 200, e.g., to one or more hydraulic cylinders (not shown) controlling extension and retraction of the boom sections 216, 217, 218. In the illustrated embodiment as shown in FIG. 6 by way of example, boom sections 216, 217, 218 are retracted, representing outer boom section 216, mid boom section 217, and inner boom section 218. In some embodiments, more or fewer boom sections 216, 217, 218 may be employed.

Figure 7A:
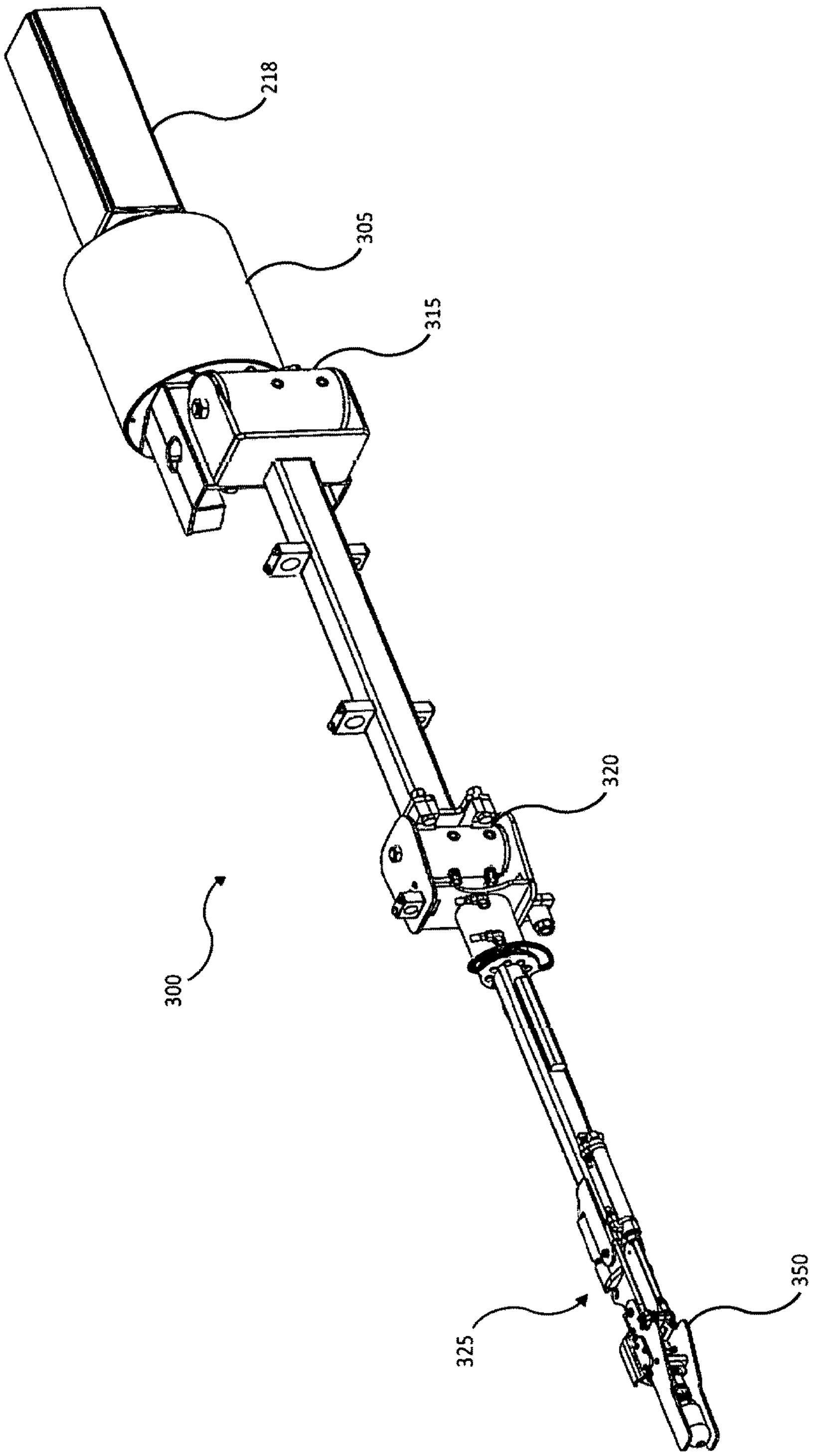
FIG. 7A is a perspective view of the manipulator arm of FIG. 5A.
Figure 7B:
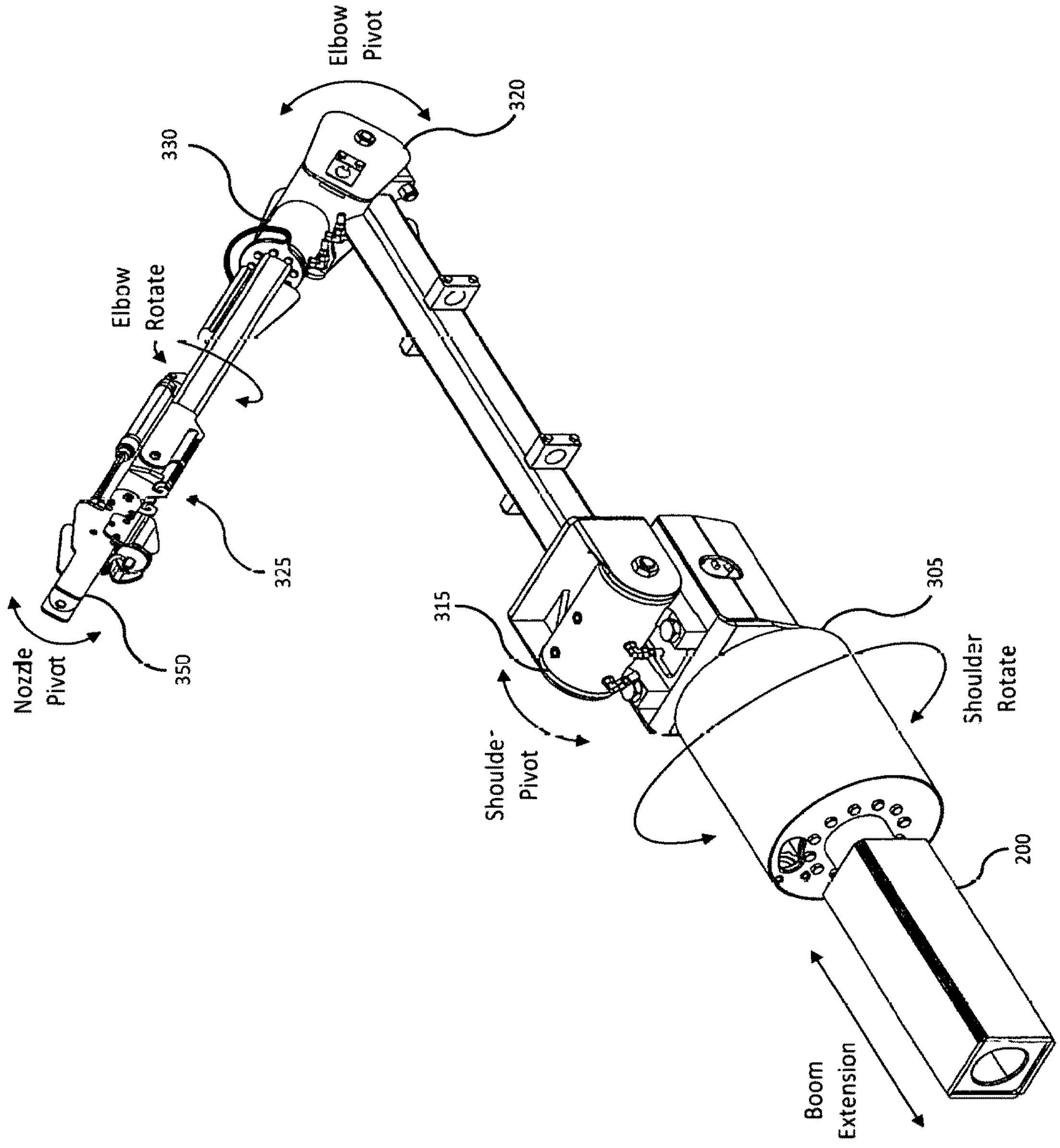
FIG. 7B illustrates a range of motion of the manipulator arm of FIG. 7A.

FIGS. 7A and 7B illustrate perspective views of the manipulator arm 300 according to some embodiments. The illustrated manipulator arm 300 includes a shoulder rotate joint 305, a shoulder pivot joint 315, an elbow pivot joint 320, an elbow rotate joint 330, a nozzle pivot joint 325, and an end effector 350. In the illustrated embodiment, the manipulator arm 300 is coupled to the inner telescoping section 218 of the extension boom 200, although other arrangements and connections of the manipulator arm 300 with respect to the extension boom 200 are possible, and fall within the spirit and scope of the present invention. FIG. 7B illustrates the range of motion for the manipulator arm 300. In some embodiments, the degrees of freedom of the manipulator arm 300 include one or more of shoulder roll, shoulder pitch, elbow roll, elbow pitch, and two types of nozzle pitch (e.g., corresponding to different movable sections of the end effector 350). In the illustrated embodiment by way of example, the degrees of freedom of the manipulator arm 300 include shoulder roll from 0 to 360 degrees, shoulder pitch from 0 to 180 degrees, elbow roll from 0 to 180 degrees, elbow pitch from −135 to 45 degrees, first section nozzle pitch from 0 to 30 degrees, and second section nozzle pitch from 0 to 90 degrees. Thus, the manipulator arm 300 has at least one degree of freedom, but may include two or more degrees of freedom, three or more degrees of freedom, four or more degrees of freedom, five or more degrees of freedom, six or more degrees of freedom, or at least seven degrees of freedom in some embodiments.

Figure 8A:
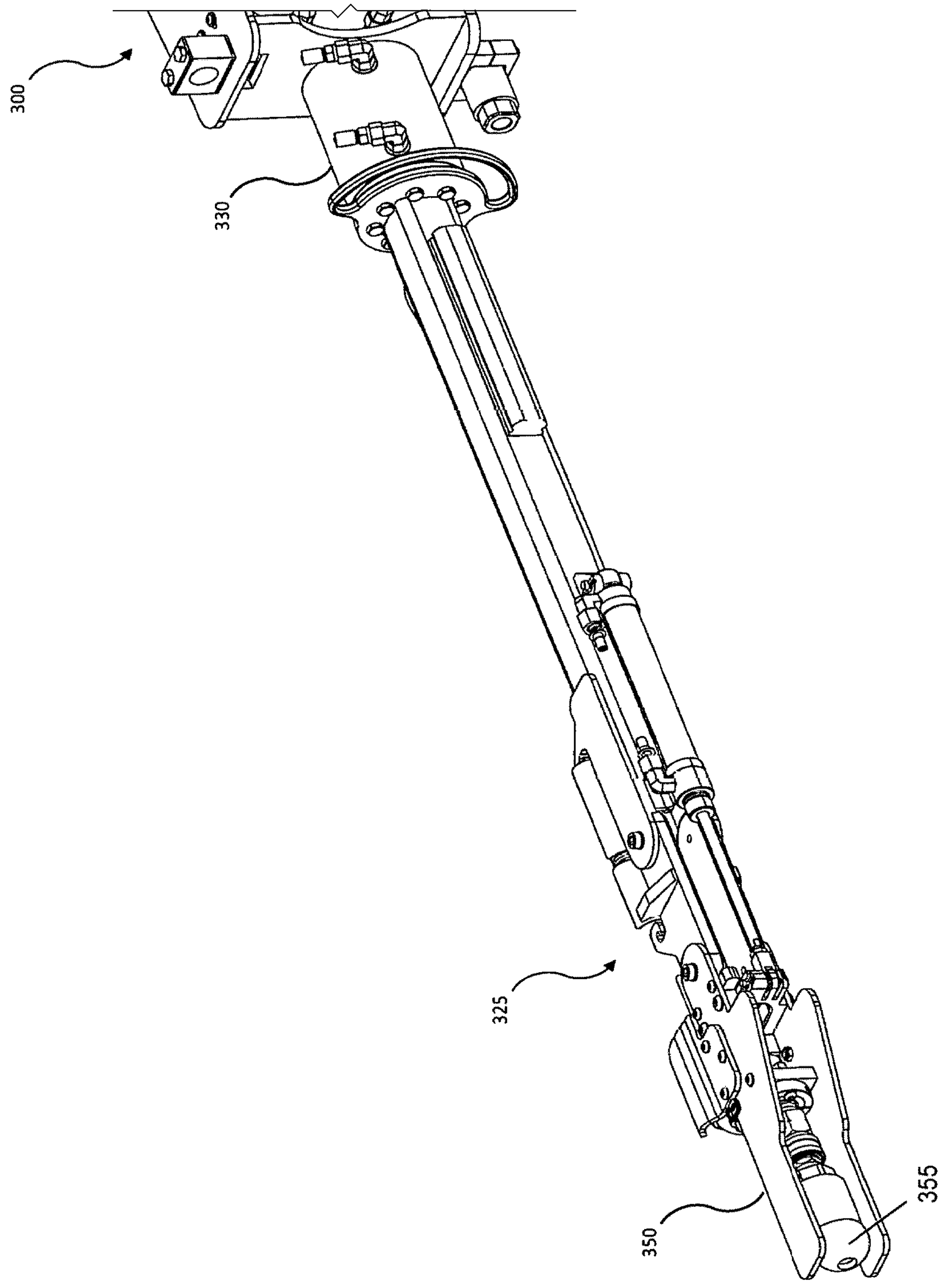
FIG. 8A is a bottom perspective view of an end effector coupled to the manipulator arm of FIG. 7A.
Figure 8C:
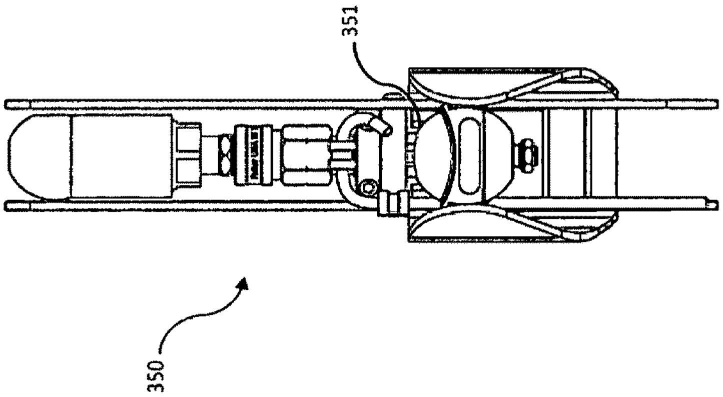
FIG. 8C is a top view of the end effector shown in FIG. 8A.
Figure 8B:
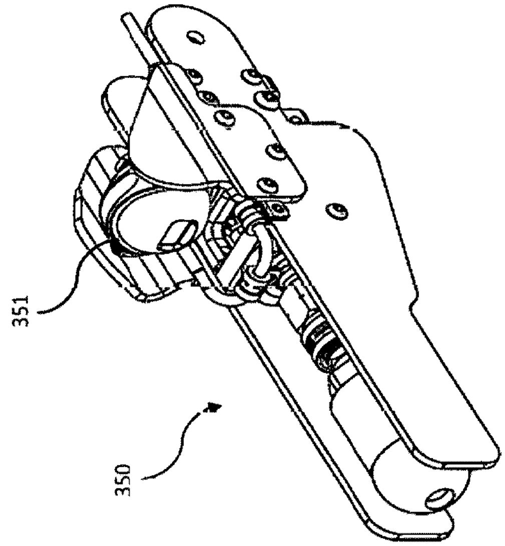
FIG. 8B is a side perspective view of the end effector shown in FIG. 8A.

FIG. 8A illustrates a perspective view of an end effector 350 coupled to the manipulator arm 300 according to some embodiments. In the illustrated embodiment, the end effector 350 includes a rotatable high pressure nozzle 355. In some embodiments, the nozzle 355 can be configured to provide sufficient pressure to effectively clean at least two feet away from a surface, and may be effective at greater distances. However, the FTS 100, 100' can include other end effectors 350, which can be interchangeable depending on the desired operation. Some possible end effectors 350 include a brush (e.g., a wire brush), which may be rotatable, a polisher, a grinder, a reciprocating saw, a water pressure washing nozzle, a degreaser or other cleaning agent application nozzle operatively coupled to the degreaser barrel 220, a spray coating or paint nozzle, a foaming nozzle, an inspection end effector for supporting one or more video cameras having the same or different lenses selected from standard, wide-angle, ultra-wide angle, macro, telephoto, and other lenses gathering information about the space, and a sample-gathering or testing end effector to gather information on the contents or residues within the space, among others. FIG. 8B is a perspective view of an example of an end effector 350 including a video camera, whereas FIG. 8C is a top view of the same end effector 350.

Figure 9A:
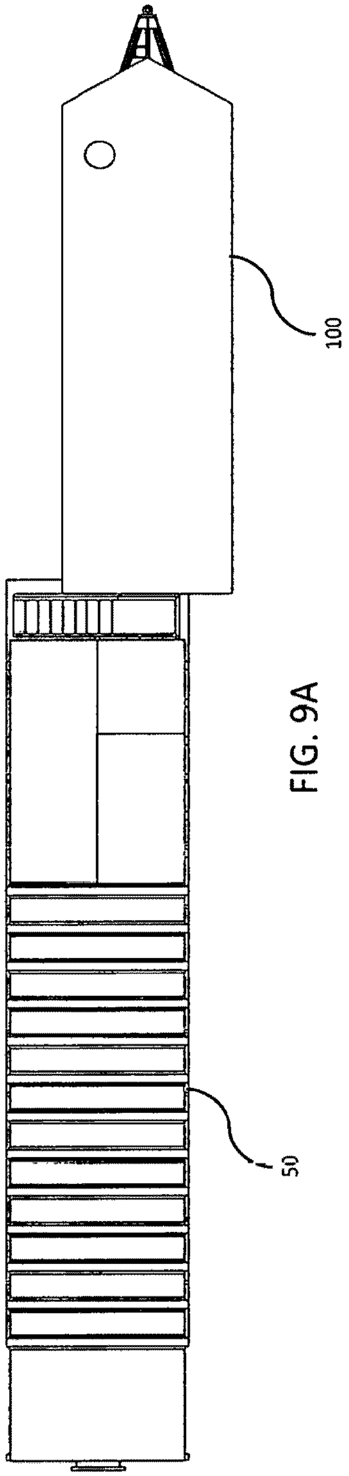
FIG. 9A is a top view of the portable FTS of FIG. 3A, shown aligned with the frac tank of FIG. 1.
Figure 9B:
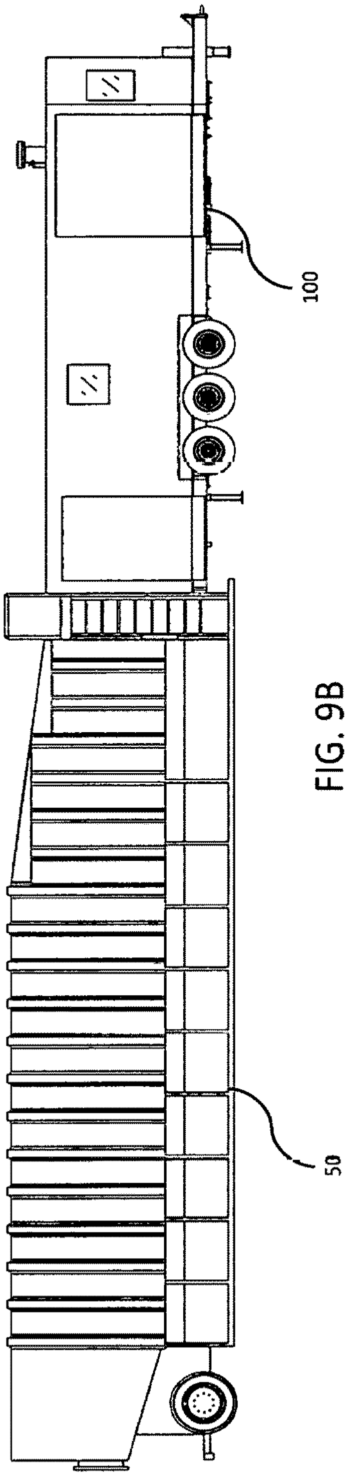
FIG. 9B is a side view of the portable FTS and frac tank of FIG. 9A.
Figure 9C:
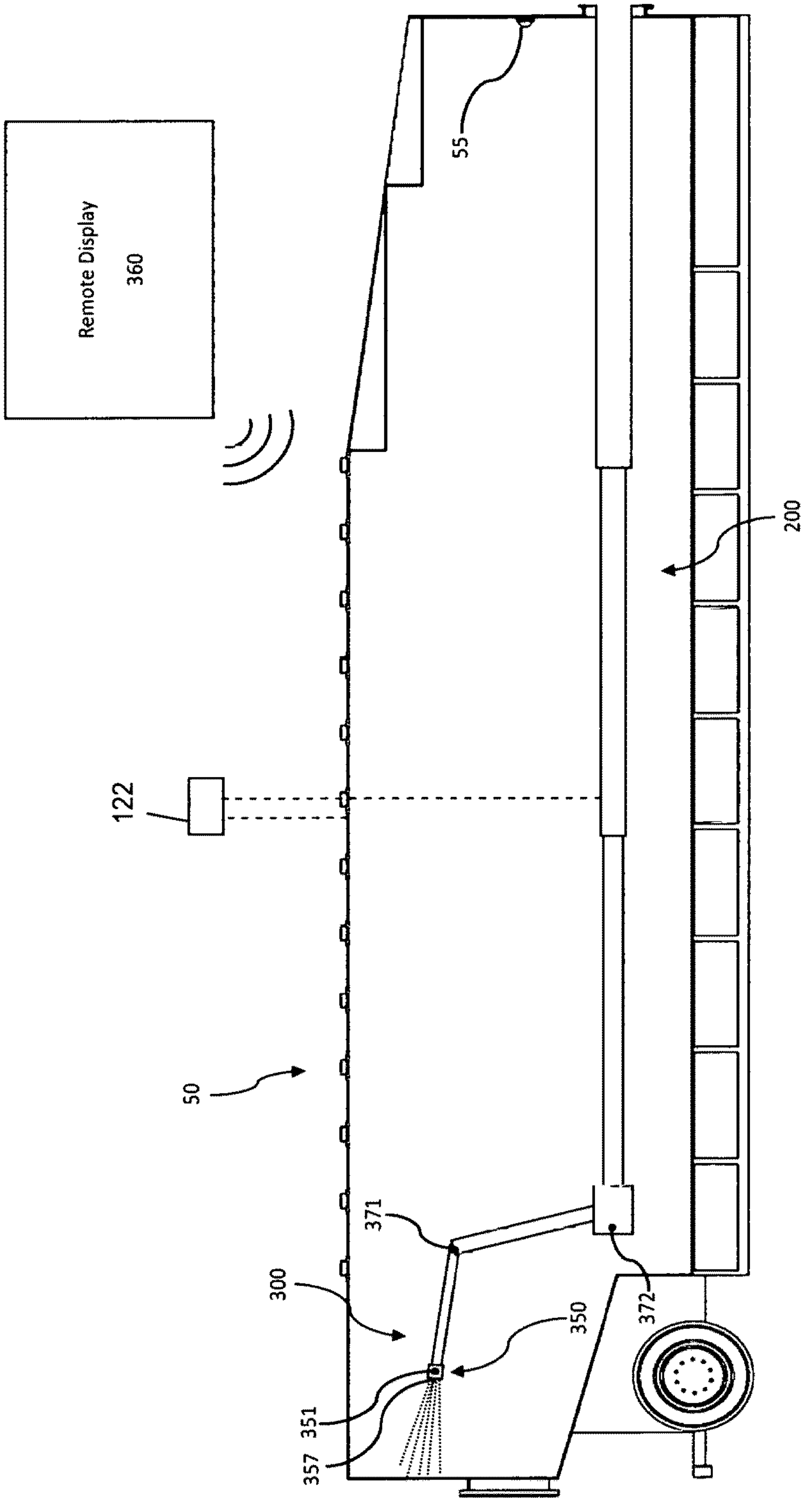
FIG. 9C illustrates locations of cameras and/or sensors on the extension boom of FIG. 5A, manipulator arm of FIG. 5A, and/or the interior of the frac tank of FIG. 1.
Figure 9D:
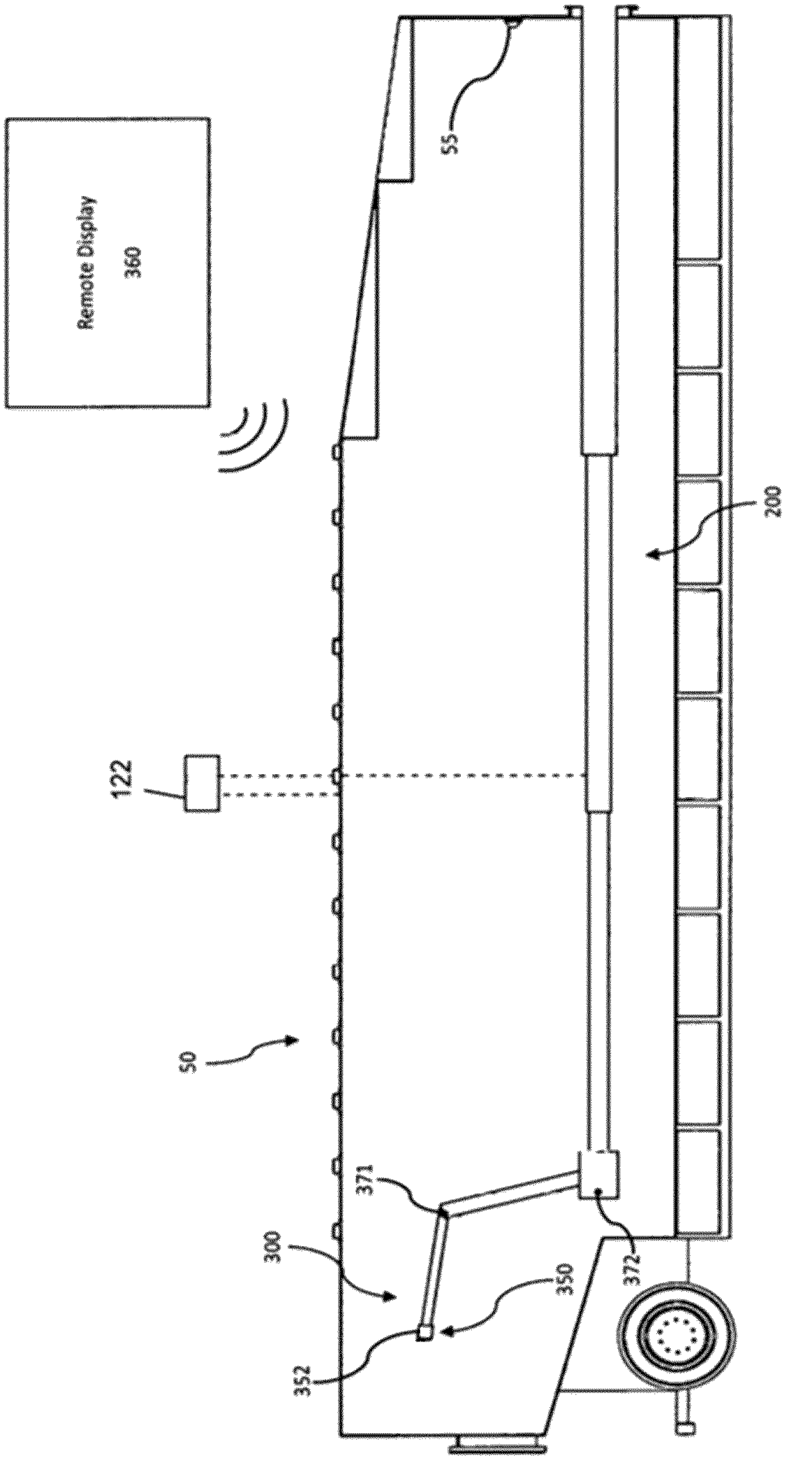
FIG. 9D illustrates location of a light on the extension boom of FIG. 5A, manipulator arm of FIG. 5A, and/or the interior of the frac tank of FIG. 1.

In some embodiments, such as is illustrated in FIGS. 9C and 9D, the end effector 350 may include one or more sensors, light(s) 352, camera(s) or combinations thereof. As an example, the end effector 350 may include one or more wireless or wired cameras 351. The camera 351 may be operatively coupled to a remote display 360, and in other embodiments may be operatively coupled to the operator station 210, which includes a human-machine interface having a display 221 and input actuators 227. The camera 351 may be controllable by the operator by way of the remote display 360 or the operator station 210 for examining tank surfaces and for other inspection purposes. One or more cameras 351 may also be used simultaneously with end effector tools 357 such as scrapers, sanders, fastener tools, cutting tools, and other tools used for tank maintenance, inspection, refurbishment, and repair. However, such end effectors are not intended as limitations, and alternate camera embodiments are possible, e.g., to include cameras configured with sensors.

In some embodiments, in addition to or instead of a camera 351 supported by the end effector 350, one or more cameras and/or other sensors 371 and 372 may be coupled to other positions within the tank 50, on the manipulator arm 300, and/or the extension boom 200. The camera(s) 351 and sensors 371, 372 can be operatively coupled to the remote display 360 and/or to the operator station 210 (FIG. 4D), e.g., to send signals indicative of the sensed parameter to the remote display 360 and/or the operator station 210. Feedback signals from the camera(s) 351 and the sensors 371, 372 may be used for controlling rotation and/or distance positioning of the extension boom 200 and/or the manipulator arm 300, to determine the physical characteristics of material within the tank 50 (e.g., the thickness of material on the walls of the tank 50 to be cleaned, the content/consistency of debris within the tank 50) and/or to determine the condition of the interior of the tank 50. Such control may be manual (e.g., performed by the operator manually, such as by way of manual input actuators 227 sending electrical control signals to move the manipulator arm 300 in response to viewing the feedback signals) or automatic (e.g., performed by the control unit 223 by executing one or more pre-programmed algorithms or programs in response to the feedback signals). Additionally, one or more cameras 55 may be positioned at various locations on the FTS 100, 100' and/or around the interior of tank 50. Such camera(s) 55 may also be operatively coupled to the remote display 360 and/or to the operator station 210 to send signals indicative of the sensed parameter(s) (i.e., the sensed visual surroundings) to the remote display 360 and/or the operator station 210. Such cameras can also be employed for control of the manipulator arm 300 in the same ways discussed above. The remote display 360 and/or the operator station 210 may include the split or two-screen display 226 for depicting various views from multiple camera positions.

Figure 13:
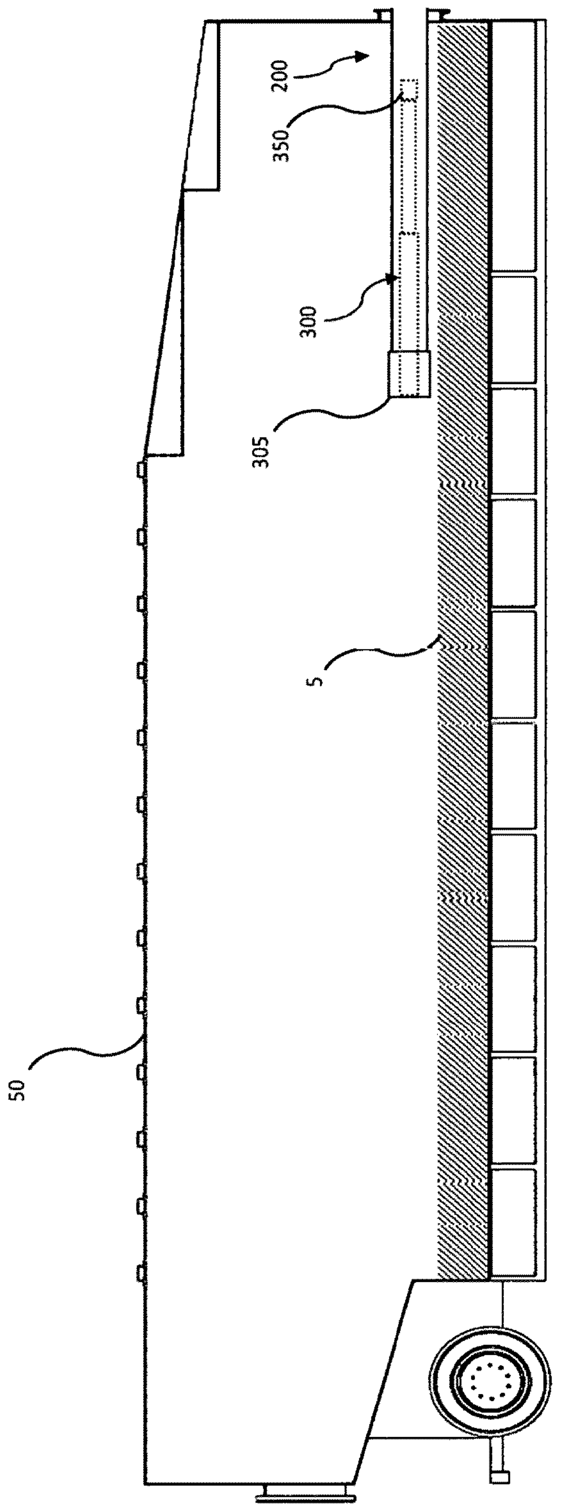
FIG. 13 is a side section view of the extension boom and manipulator arm of FIG. 5A entering the frac tank of FIG. 1.
Figure 14A:
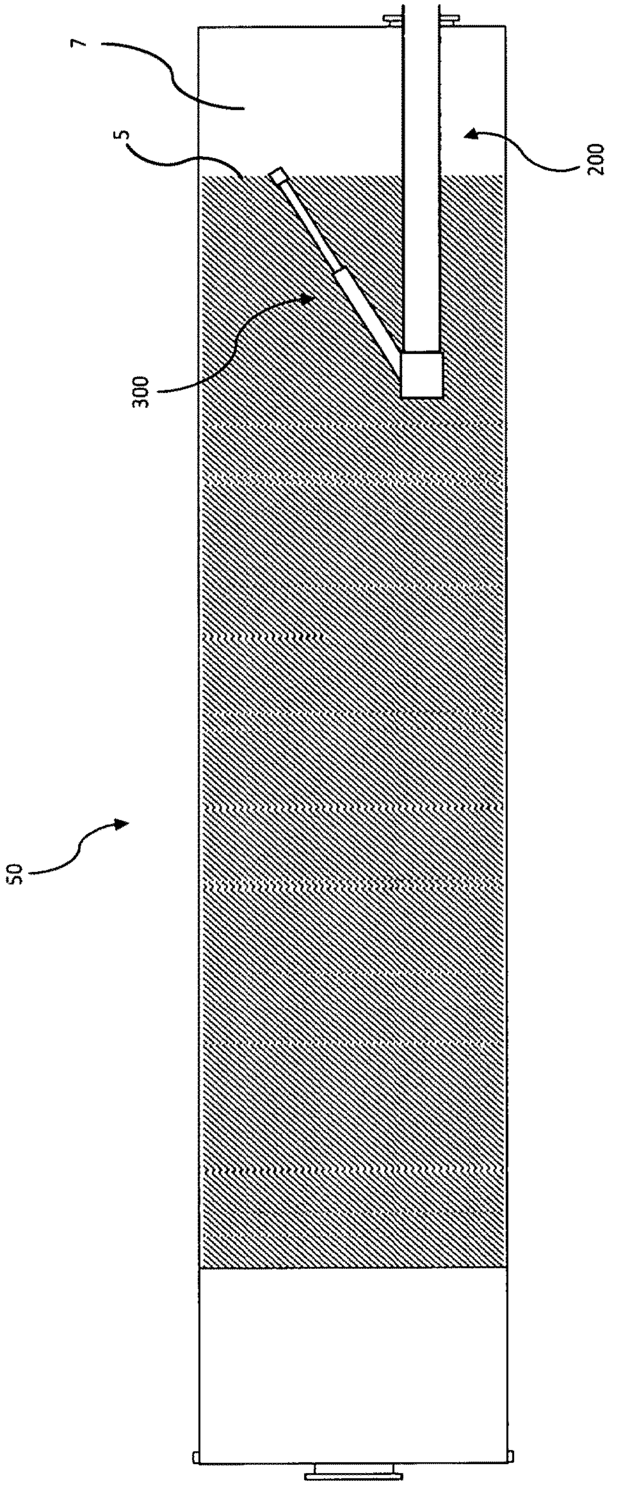
FIGS. 14A-14D illustrate top views of an FTS being used to pressure wash debris from a frac tank.
Figure 14B:
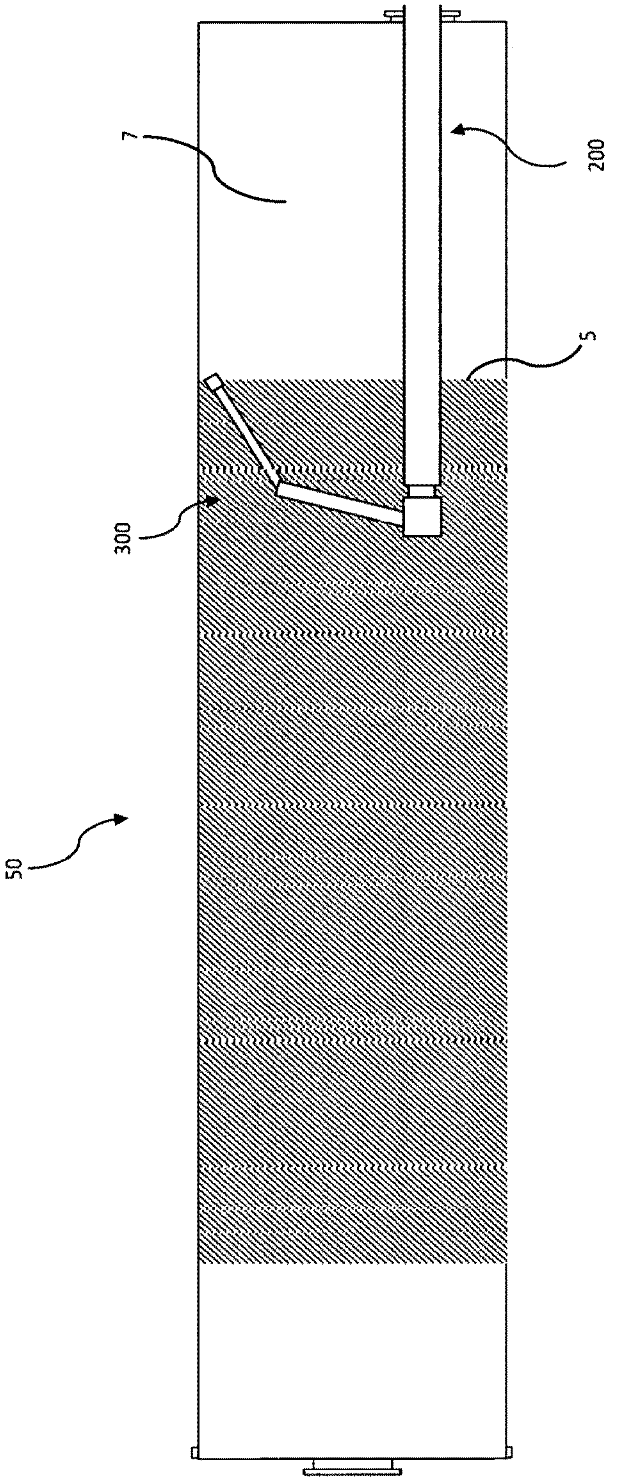
Figure 14C:
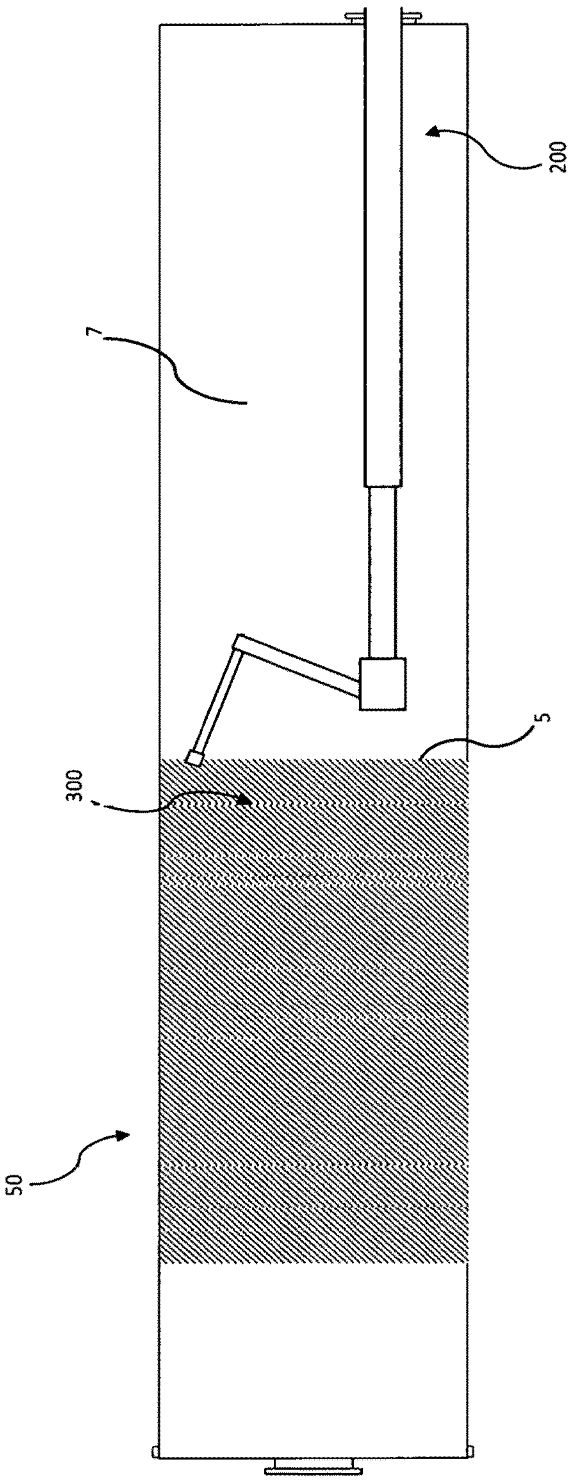
Figure 14D:
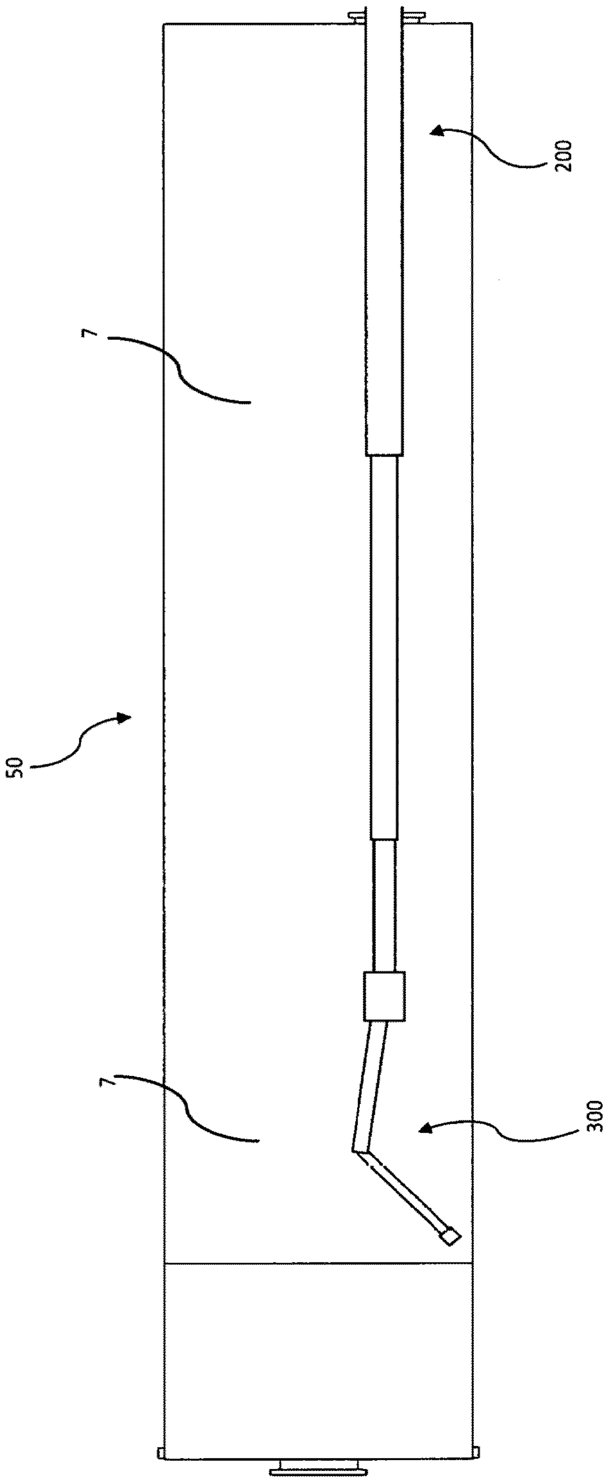
Figure 15A:
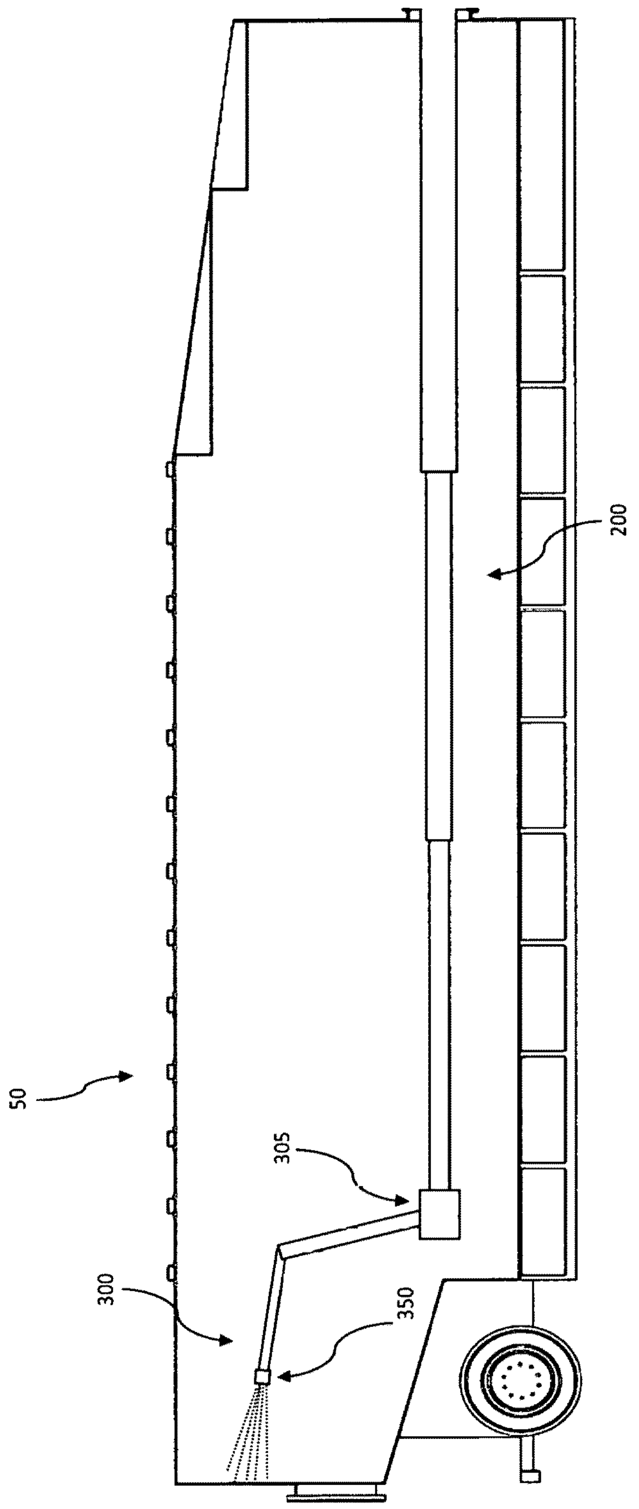
FIGS. 15A-15D illustrate side views of an FTS being used to cleaning fluid to the interior surfaces of a frac tank.
Figure 15B:
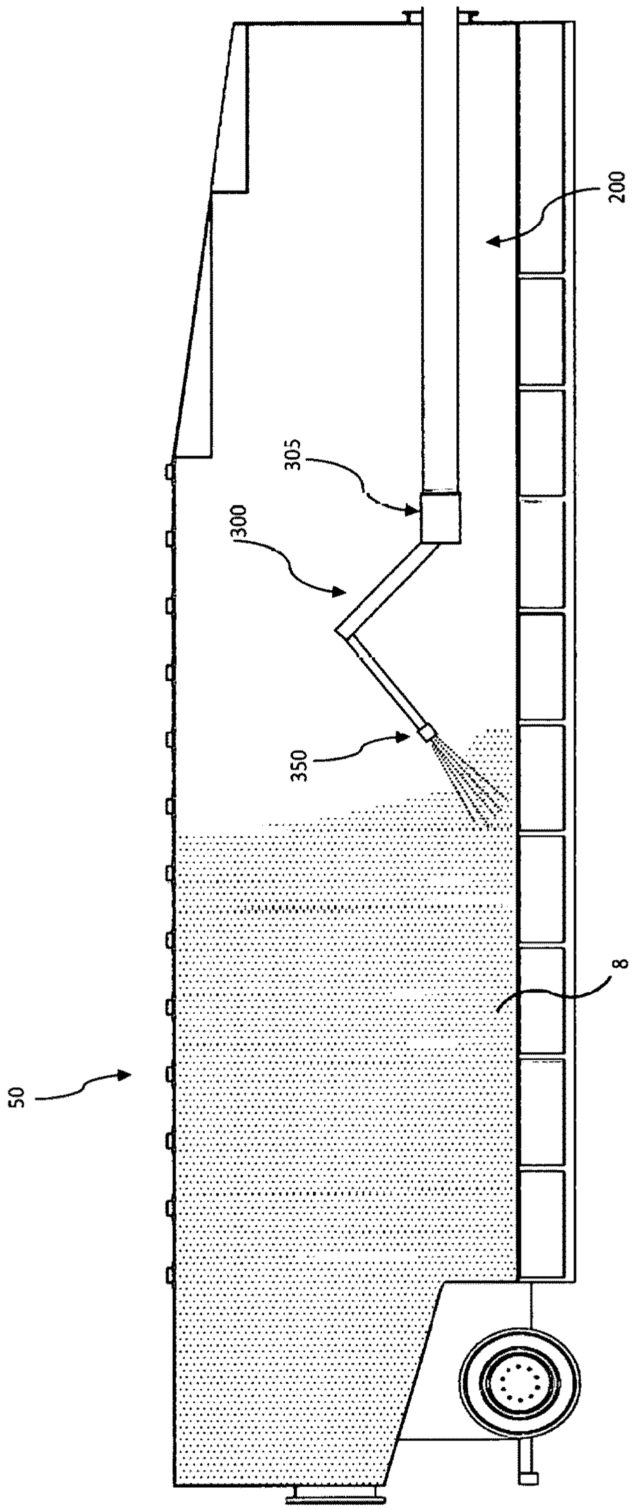
Figure 15C:
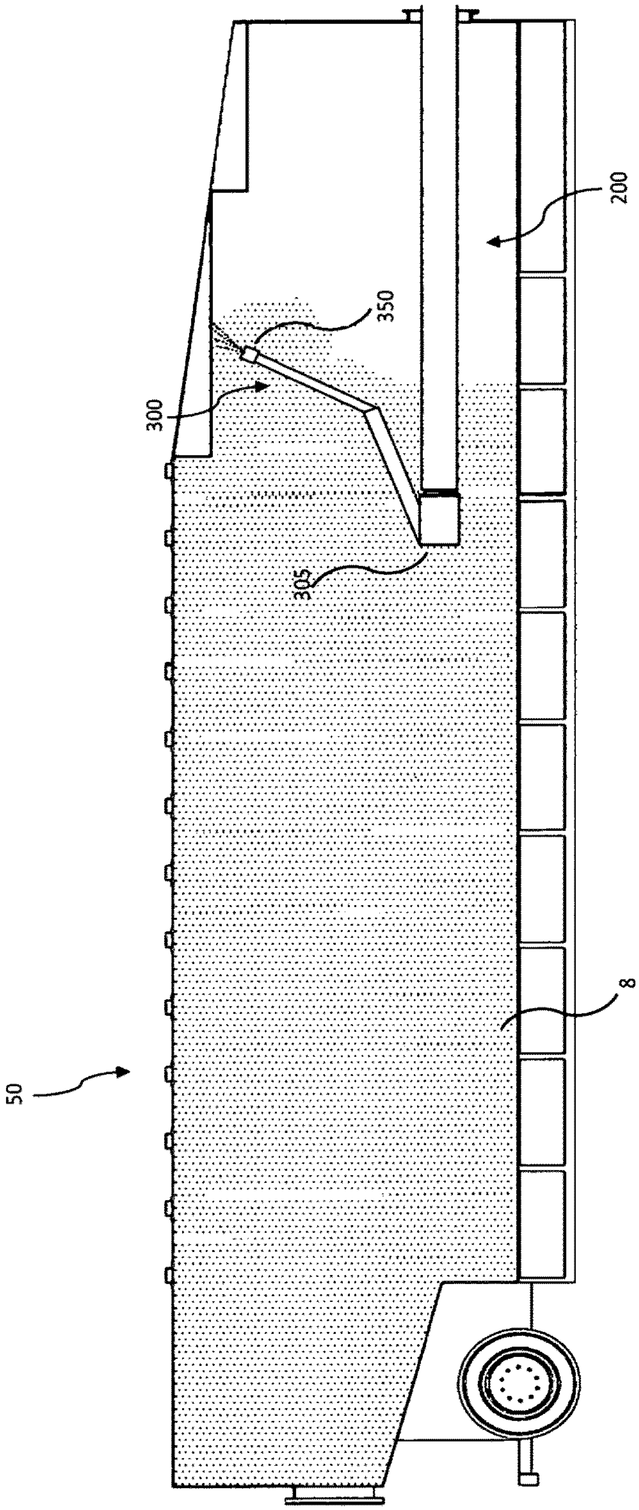
Figure 15D:
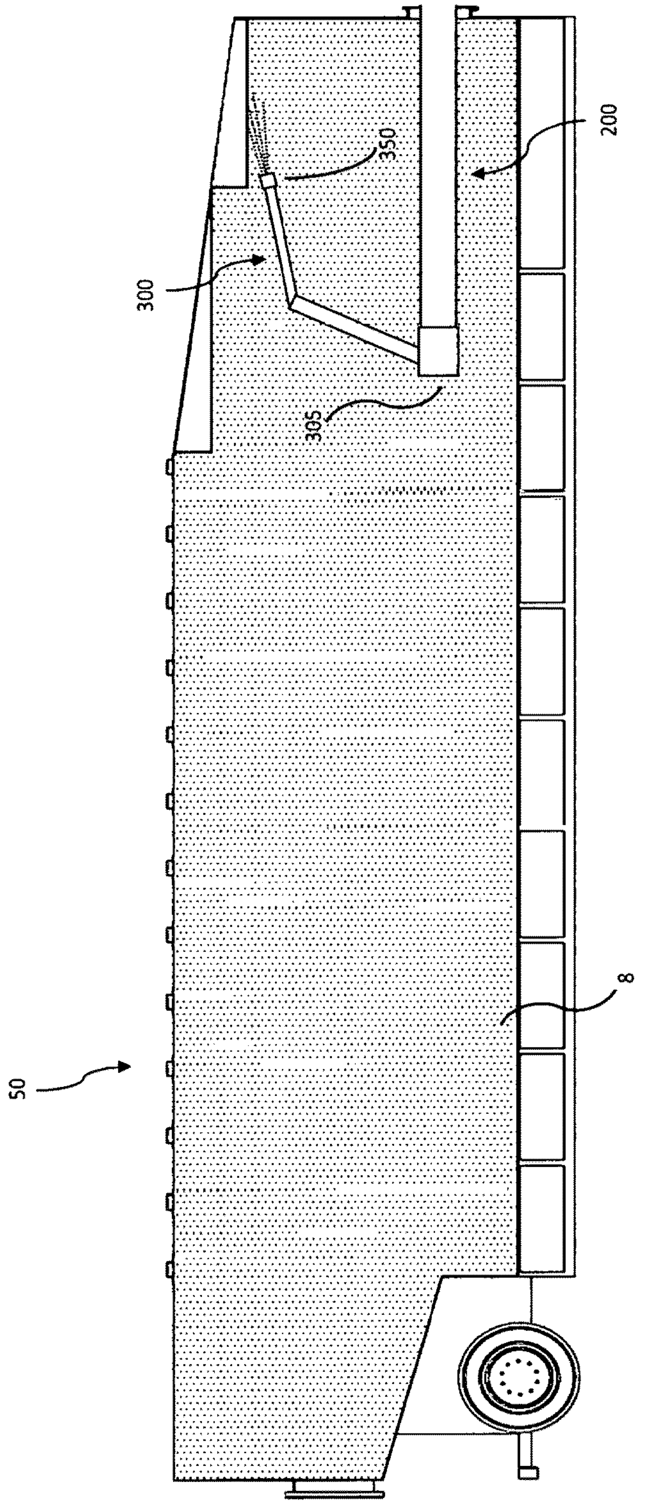
Figure 16A:
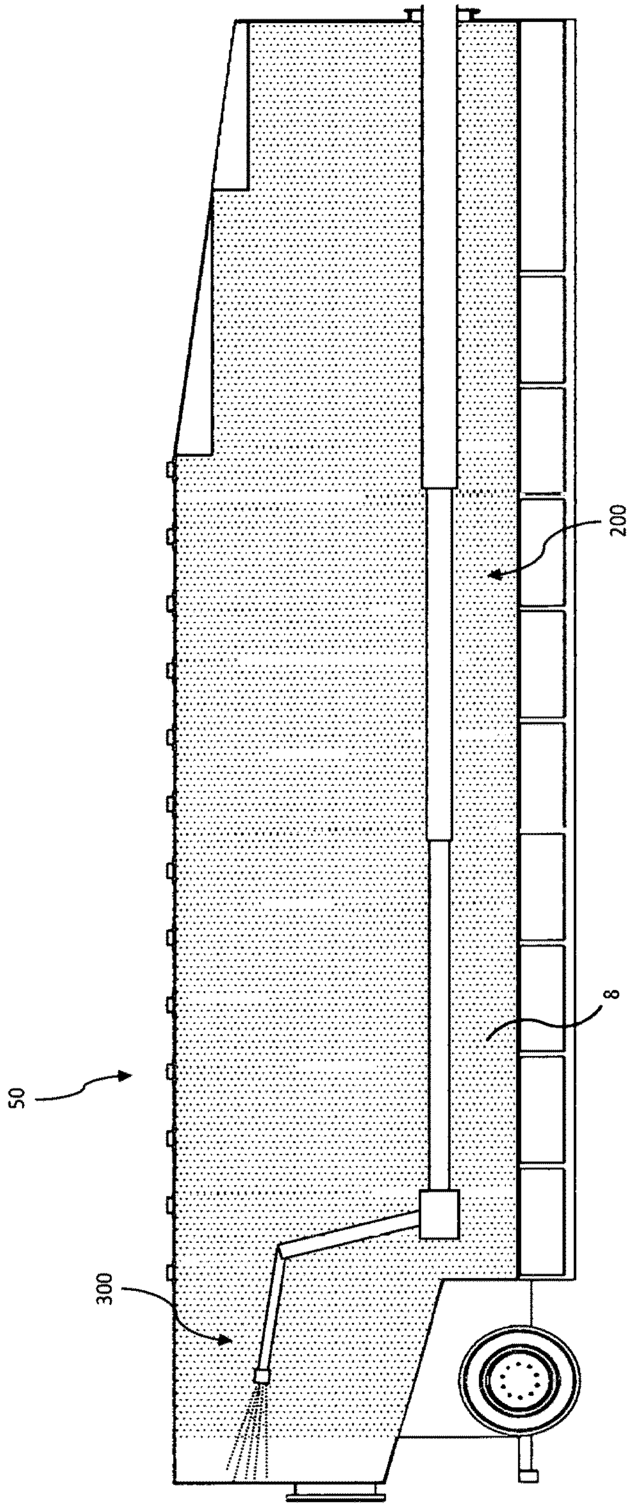
FIGS. 16A-16D illustrate side views of an FTS being used to pressure wash cleaning fluid from the interior surfaces of a frac tank in a rinsing operation.
Figure 16B:
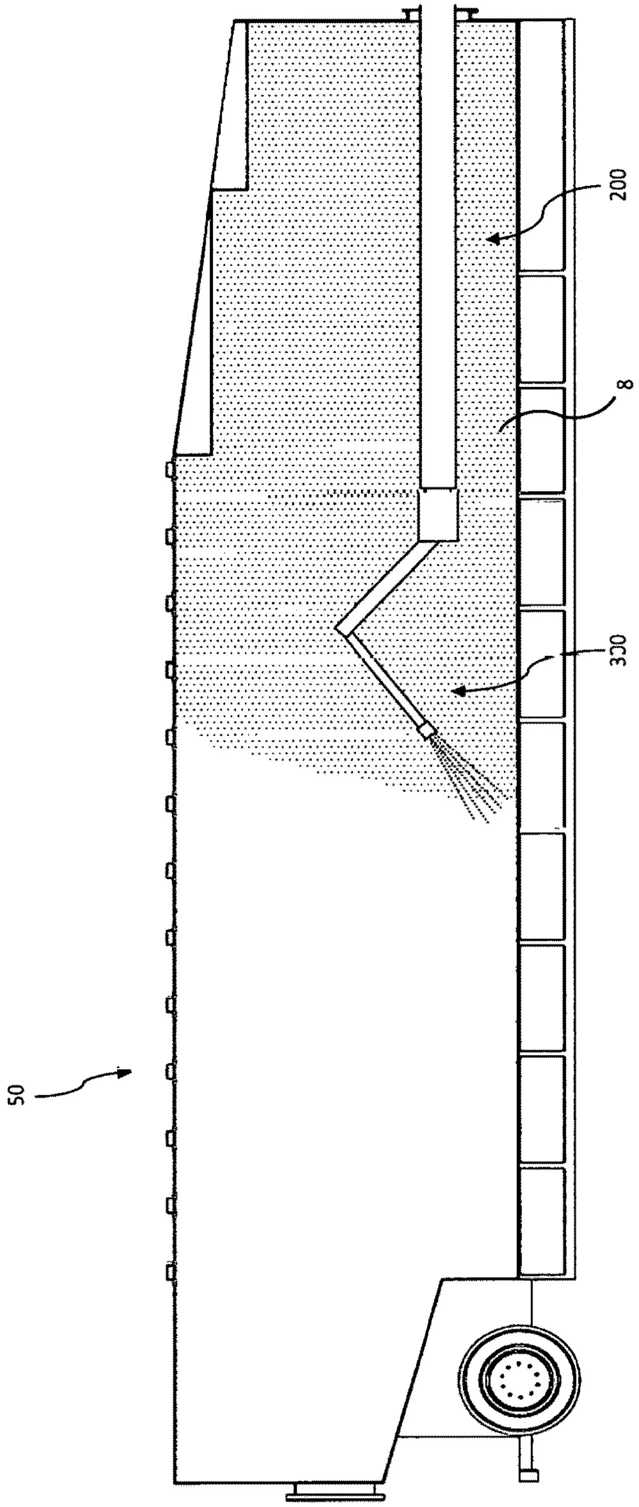
Figure 16C:
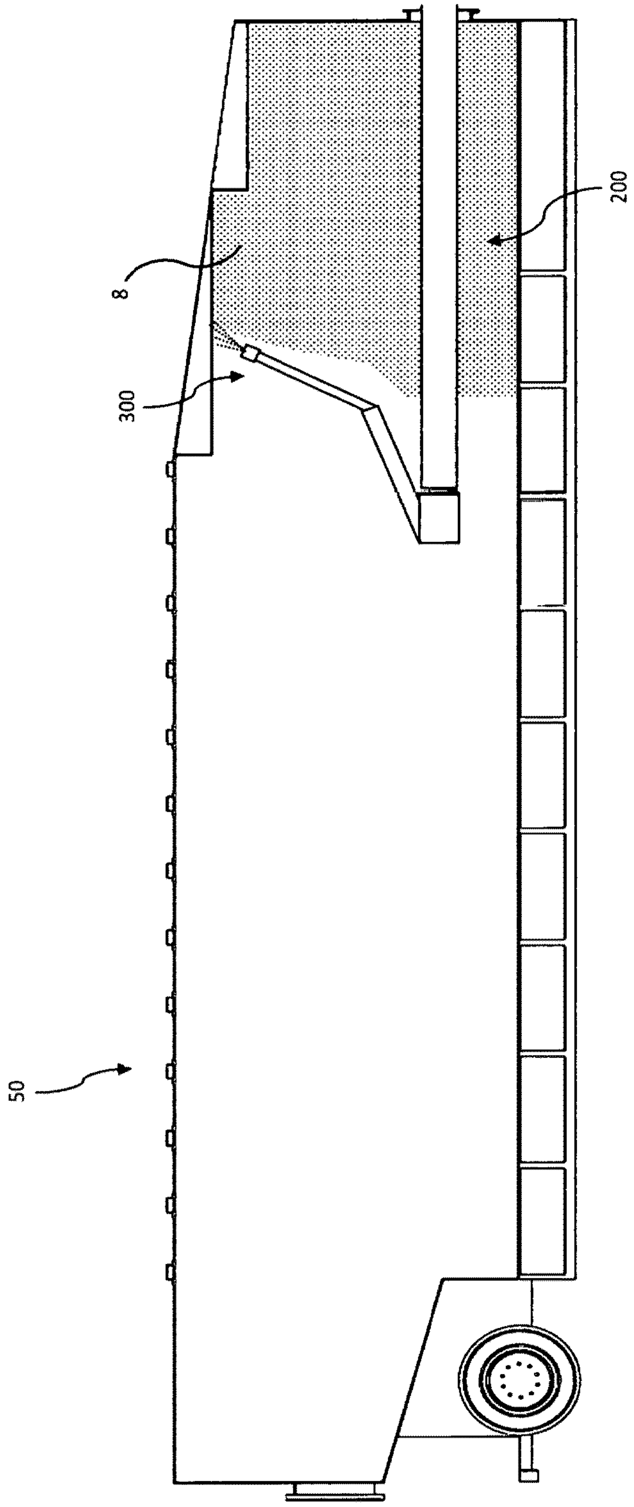
Figure 16D:
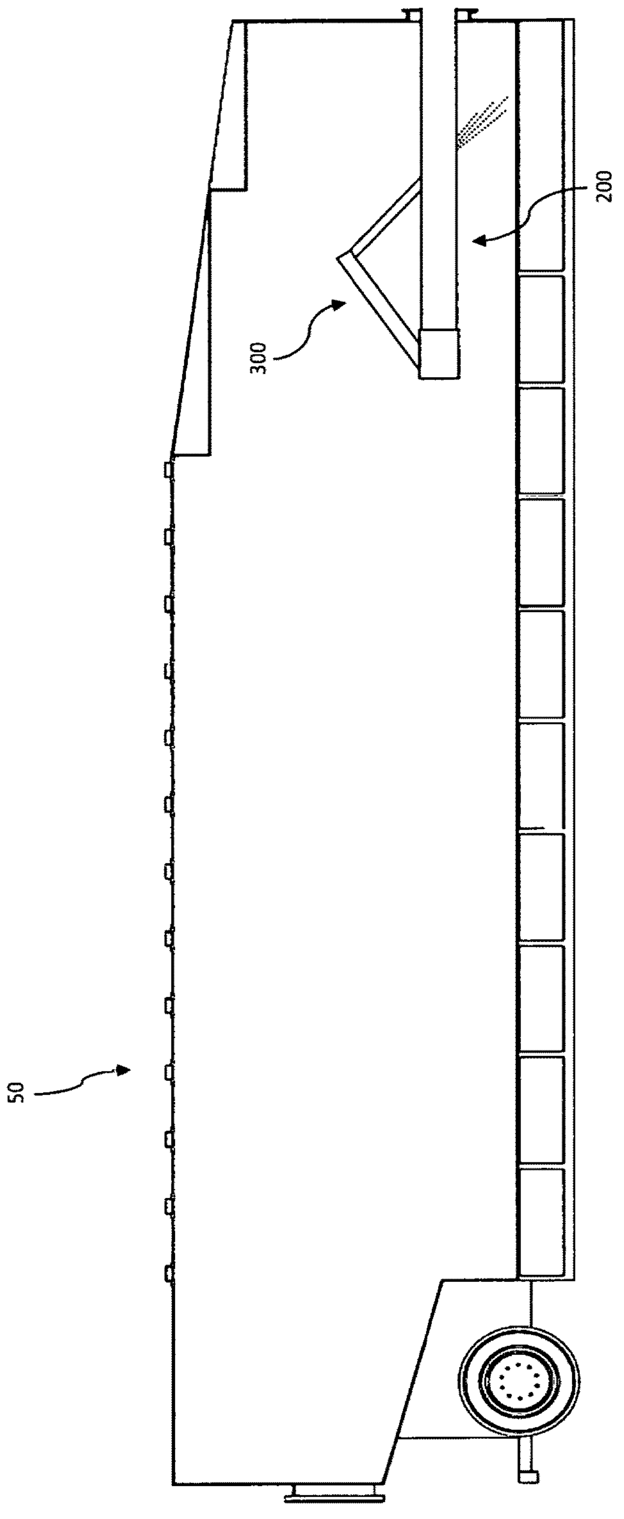

The stowed and deployed positions of the manipulator arm 300 with respect to the extension boom 200 as described above can provide advantages in enabling quick change-out or servicing of end effectors 350. In particular, rather than withdraw the FTS 100 entirely from a frac tank 50 every time the end effector 350 needs to be changed (i.e., for a different stage in the cleaning operation of the frac tank 50), the stowed positions of the manipulator arm 300 enables a user to easily access the end effector 350 from outside the frac tank 50 or from an otherwise more desirable location for changing and servicing the end effector 350. An example of this access is shown in FIG. 13, where the manipulator arm 300 is in a stowed position with respect to the extension boom 200, and in which the end effector 350 is therefore accessible to a user through the manway 15 without requiring withdrawal or further withdrawal of the FTS 100 from the frac tank 50.

The work envelope of the manipulator arm 300 may accommodate a wide range of tank designs with various manway 15 locations. Also, the manipulator arm 300 may be used for a variety of different applications.

Process

Figure 10:
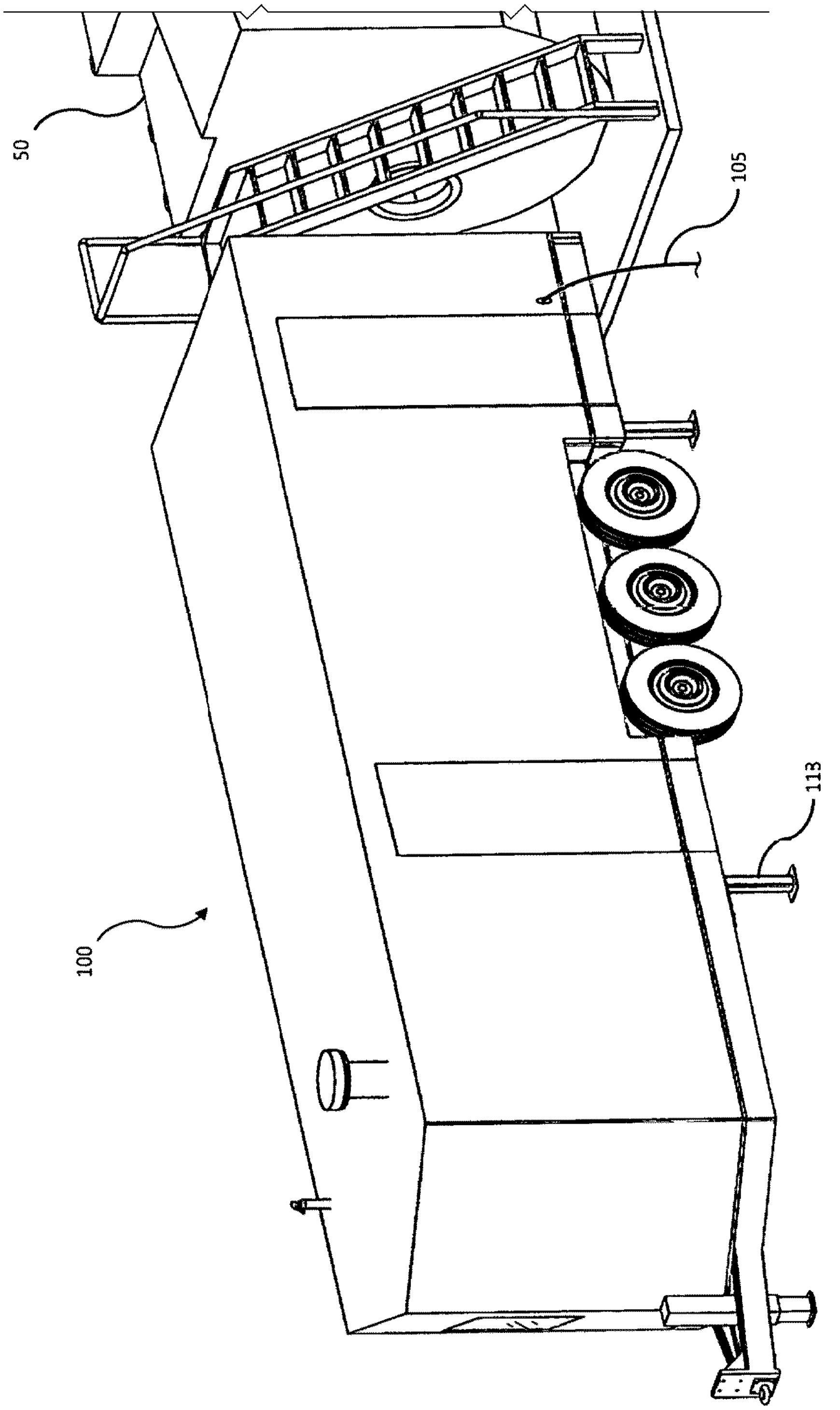
FIG. 10 is a perspective view of an FTS aligning vertically with the frac tank of FIG. 1.

FIGS. 9A-9C illustrate an FTS 100 according to an embodiment shown aligning to a frac tank 50, although it should be understood that any description herein of the functionality and use of the FTS 100 also applies to the FTS 100' and the other FTS embodiments described and illustrated herein. In FIG. 10, the FTS 100 is vertically aligned using supports 118 which are extended from the FTS 100 to the ground to vertically align the FTS 100 with respect to the tank 50. The supports 118 also serve to add structural stability and to inhibit rolling of the FTS. Once the FTS 100 is positioned, a ground wire 105 may be placed in the ground to ground the electrical components in the FTS 100, as also shown in FIG. 10.

Figure 11:
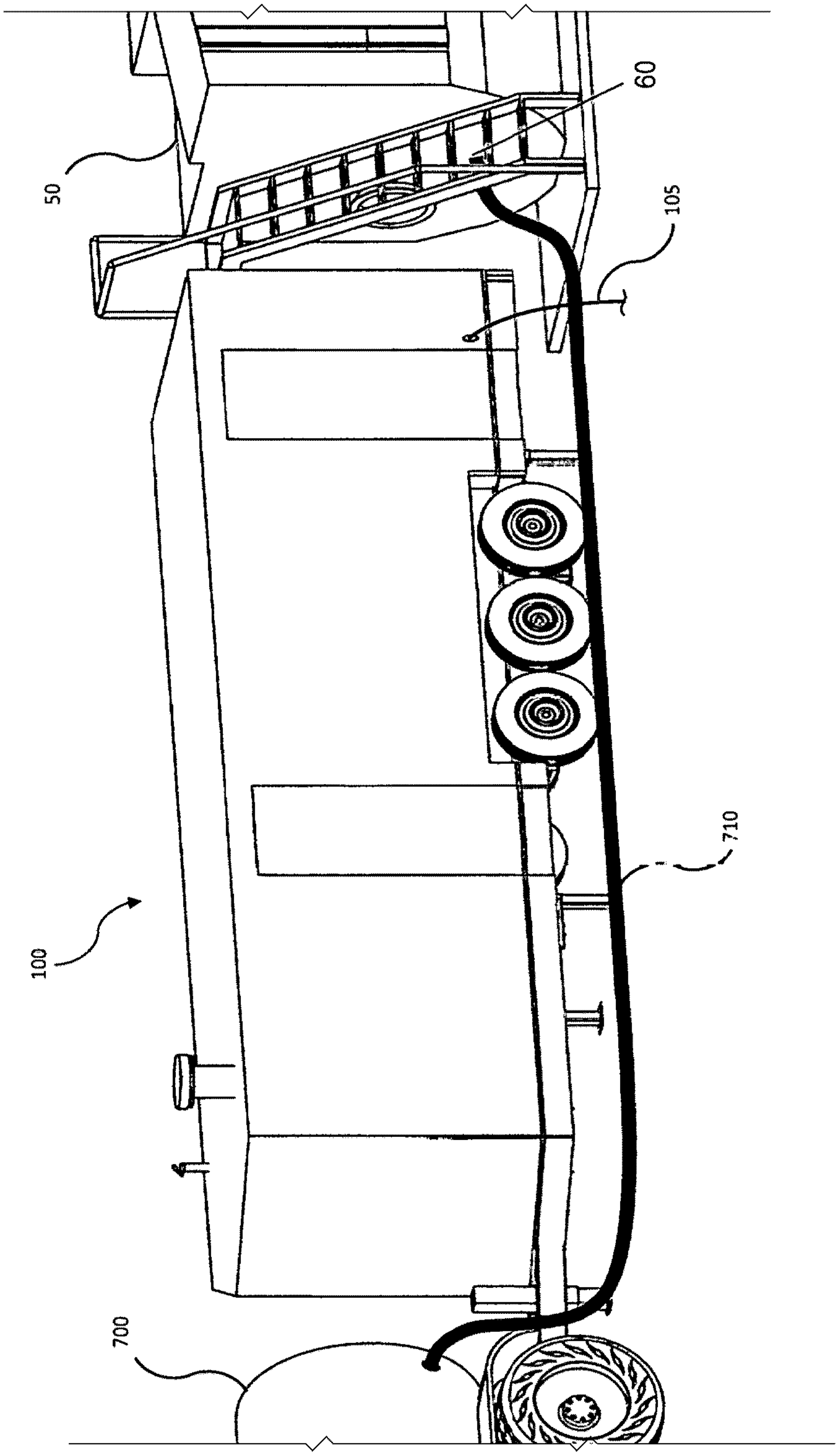
FIG. 11 illustrates connection of a vacuum hose to the frac tank for debris removal.

FIG. 11 illustrates the connection of a vacuum hose 710 to a vacuum port 60 the frac tank 50 for debris removal. The vacuum hose 710 may be connected to a vacuum truck 700, in some embodiments. When a vacuum truck 700 is used for debris removal, it may also be used to reposition and relocate the FTS 100. Some embodiments may utilize other vacuuming and/or debris disposal systems and methods.

One or more preliminary steps may need to be completed prior to extending the manipulator arm 300 and extension boom 200 into the tank 50. These steps can include one or more of cleaning the manway 15, powering on the equipment, aligning the extension boom 200 and manipulator arm 300 with respect to the manway 15, and installing sensors and/or lights in and/or around the tank 50. In some embodiments, cleaning the manway 15 can include manually spraying the manway 15 with a pressure washer. A clean manway 15 will reduce the risk of equipment abrasion when the FTS 100 is entering or leaving the tank 50, as well as to reduce the spread of potentially hazardous materials outside of the tank 50.

Figure 12:
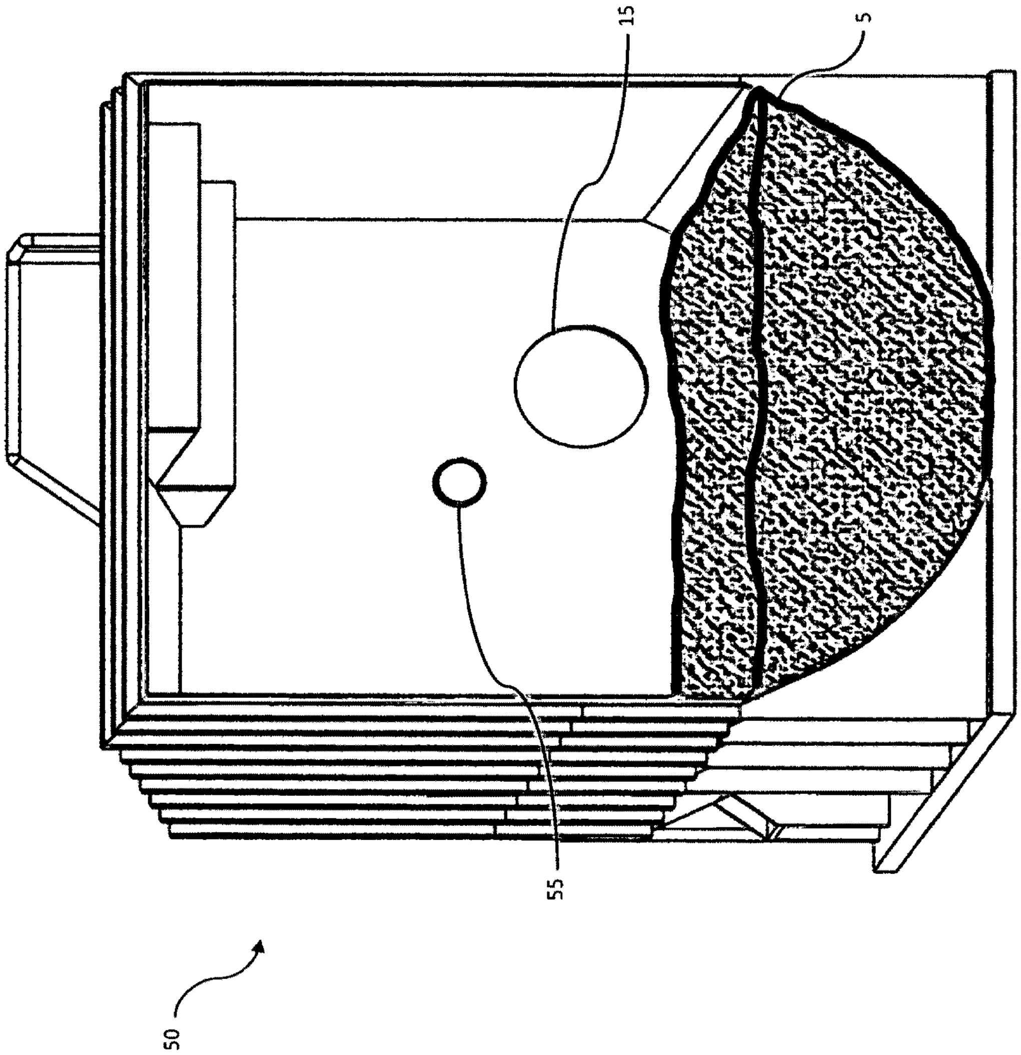
FIG. 12 illustrates a location for a camera mount within the frac tank of FIG. 1.

FIG. 12 depicts a potential location for a camera and/or light mount 55 within the frac tank 50. As described above, in some embodiments, additional sensors, cameras, and lights can be placed at other locations within the tank 50, and can be operatively connected to the control station 210 and/or the remote display 360. In the illustrated embodiment, a camera and/or light 55 is mounted just inside the manway 15 because such a position has good coverage of the entire tank interior, and such an installation can be performed without requiring tank entry by an operator. If a camera is mounted on the back wall of the tank 50 near the manway 15, the view provided by the camera can be along the length of the extension boom 200 and manipulator arm 300, which allows for more intuitive control over operations in the tank 50 in some embodiments in which the FTS 100 is manually controlled.

FIGS. 13-16D illustrate various cleaning operations performed upon frac tanks 50 by FTSs 100 according to some embodiments, and are presented by way of example only without the intent to be limiting. The extension boom 200 and manipulator arm 300 in FIGS. 13-16D have been simplified for clarity.

FIG. 13 illustrates a side section view of the extension boom 200 and manipulator arm 300 entering a frac tank 50. In the illustrated embodiment, the shoulder rotate 305 and the end effector 350 are shown folded with the manipulator arm 300 in a stowed position as described above. Debris 5 is shown in the bottom of tank 50. Once the extension boom 200 is properly aligned with respect to the manway as also discussed above, the extension boom 200 can enter the tank 50 to begin operations. In the illustrated embodiment, the manipulator arm 300 remains folded in the stowed position with respect to the extension boom 200 during insertion. In some embodiments, the manipulator arm 300 may be extended into the tank 50 first, including in a deployed position.

FIGS. 14A through 14D illustrate the FTS 100 being used to pressure-wash debris 5 from a tank 50, leaving pressure washed area 7. In the illustrated embodiment, the pressure washing process begins at the proximal portion of the tank 50, and works back toward the far end of the tank 50. In some embodiments, a pressure washing process may instead begin at the far end of the tank 50 and continue toward the proximal end of the tank 50. The direction in which a pressure washing step may occur can be dependent upon the particular application. In some embodiments, a pressure washing step may include the walls and or ceiling of the tank 50 in addition to the floors of the tank 50. During a pressure washing process according to the illustrated embodiment and other embodiments, the end effector 350 will be oriented to face back along the manipulator arm 300 toward the proximal end of the tank 50 whenever possible in order to push any debris 5 toward the vacuum port 60 for more effective removal. Depending on the application and the material coating the surfaces of the tank 50, pressure washing may continue as the manipulator arm 300 is withdrawn from the tank, and/or the step may be repeated.

In between steps, the manipulator arm 300 may be withdrawn partially or entirely from the tank 50 in order to change the end effector 350. As described above, there are many end effector 350 options depending upon the particular application and operations required.

In some embodiments, a liquid curtain (e.g., rinsing water, cleansing agent, and the like) can be placed just inside the entrance of the tank 50 (e.g., the manway 15) to rinse and/or decontaminate the manipulator arm 300 and boom 200 as they are being withdrawn from the tank 50. The rinse liquid may flow to the base of the tank 50 and be removed with the other contaminants such that there is a single waste stream. In some embodiments, an air curtain may also or instead be placed inside or outside of the entrance to the tank 50 such that the air curtain dries the manipulator arm 300 and the extension boom 200 as they are being retracted from the interior space of the tank 50. This method allows the FTS 100 to be self-cleaning, thereby reducing the spread of contaminants to the environment and worker exposure to the contaminants. Should rinse and/or air curtains be utilized, they can be turned on and off as needed so as reduce the waste of material and/or energy.

FIGS. 15A through 15D illustrate the FTS 100 being used to apply a cleaning fluid 8 (e.g., degreaser, detergent, or other cleaning agent) to the interior surfaces of a frac tank 50. In the illustrated embodiment, this application begins at the far end of the tank 50 and progresses toward the proximal end. However, this process may be carried out in any order. In some embodiments, the cleaning fluid 8 may be allowed to sit on the surfaces for a period of time, depending at least in part upon the residues in the tank 50 and the properties of the cleaning fluid 8, to break down or otherwise modify the residues before being removed.

In some embodiments, should a cleaning fluid 8 be applied, it may be removed with a pressure washing step. FIGS. 16A through 16D illustrate the FTS 100 being used to pressure wash degreaser or cleansing agent 8 from the interior surfaces of a frac tank 50. In the illustrated embodiment, the pressure washing process begins at the far end of the tank 50 and proceeds toward the proximal end of the tank 50. However, this process may be carried out in any order or direction.

Sensing and Control

The FTS 100 may be controlled remotely (e.g., by way of the remote display 360 or a remote operator station) and/or on-site (e.g., by way of the operator station 210). In some embodiments, controls may be manual (e.g., the input actuators 227), using push buttons, hand cranks, or other user controls, and positioning of the manipulator arm 300 can be determined visually with the use of one or more of the lights and/or cameras 55, 351 coupled to the FTS 100 as described above. In some embodiments, the FTS 100 includes a computerized control system (e.g., the control unit 223) utilizing position feedback on some or all ranges of motion of the manipulator arm 300 described above. The control unit 223 may be either on-site or remote, and/or may include one or more mobile devices such as smart phones, laptops, and tablets, and a remote server, along with internet or network connectivity. In some embodiments, the control unit 223 can include feedback for one or more of the arm joints 305, 315, 320, 330, 325, 350, electrical controls, automatic cleaning programs, and/or camera software. In some embodiments, camera software may include one or more filters including fog filters and night vision, among others.

The position of the manipulator arm 300 may be adjustable via different and independent coarse and fine adjustment mechanisms. For example, coarse adjustment of the position of the manipulator arm 300 can be performed by way of moving the trailer 104, the supports 118, the extension boom 200, and/or the boom frame 205, wherein fine adjustment of the position of the manipulator arm 300 can be performed by way of the extension boom 200 and/or the boom frame 205 and/or one or more of the joints 305, 315, 320, 330, 325, 350 in the manipulation arm 300 itself. For example, the trailer 104 and the supports 118 provide coarse positioning of the extension boom 200 (and the manipulation arm 300) relative to the manway 15, whereas the boom frame 205 provides fine positioning of the extension boom 200 (and the manipulation arm 300) relative to the manway 15.

The boom 200 may be a hydraulically controlled, telescoping design as shown and described above, similar to that of a man lift or telehandler, which allows the manipulator arm 300 to extend into the frac tank 50. In some embodiments, one or more of the joints 305, 315, 320, 330, 325, 350 can include one or more hydraulic rotary actuators. For example, the joints 305, 315, 320, 330, 325, 350 described and illustrated herein can include two hydraulic actuators in which one controls pivot movement while the other controls rotational movement. As another example, in some embodiments the illustrated nozzle end effector 350 can include a hydraulic cylinder for an additional pivot joint. Also in some embodiments, the use of established off-the-shelf components for the FTS 100 allows for a simple and robust design.

In some embodiments, the FTS 100 includes one or more additional sensors 122, illustrated schematically in FIG. 9C, which can be coupled to any part of the frac tank 50 and/or the extension boom 200 and/or the manipulator arm 300, and operatively coupled to the control station 210. The one or more sensors 122 can include contact sensors, non-contact sensors, capacitive sensors, inductive sensors, 3D imagers, cameras, thermal imagers, thermometers, pressure sensors, accelerometers, inertial measurement units (IMUs), rotary encoders, radiation detectors, LIDARs, and strain sensors, among others. In some embodiments, one or more sensors 122 may be used to monitor strain, torque, and pressure at one or more locations in the tank 50 and/or FTS 100 as a safety mechanism to prevent catastrophic failures. In some embodiments, the one or more sensors 122 may be used to determine the position of the end effector 350 to inhibit the end effector 350 from contacting the walls of the tank 50. In some embodiments, the one or more of the sensors 122 are capable of functioning in radioactive and or corrosive environments.

In some embodiments, the FTS 100 may be used for inspection. Inspection embodiments may include one or more sensors 122 positioned, connected, and used as detailed above. In some embodiments, the tank 50 may be inspected prior to cleaning operations. A tank inspection step can yield data that can be used to pre-program the control unit 223 of the FTS 100 to perform operations automatically. In some embodiments, operators program an otherwise predetermined set of data into the FTS 100 to perform operations automatically. In some embodiments, the tank 50 can also be inspected after operations to check for any remaining residue or debris.

In some embodiments, burners, high power electrical equipment, and exhaust may be located at the front of the trailer 104. In such cases, it is often desirable to keep these hazards a minimum of 12 feet from the entrance (e.g., manway 15) of the tank 50 during operations. Also, any or all of the electrically-powered devices attached to the FTS 100, including lights and cameras, can be ATEX or NFPA certified and NAMUR rated. Other electrical power can be electrically isolated from the in-tank equipment, and all sections of the FTS 100 can be electrically bonded to an equipment ground. In some embodiments, the equipment ground is bonded to the tank 50 before starting the generator 250. In addition, fluid hoses entering the tank 50 (hydraulic or water) can be composed of non-conductive materials. An electronics enclosure can be used in the trailer 104 in order to contain electronics.

Thus, the invention provides, among other things, systems and methods for positioning an arm relative to the interior of a tank or other confined space for cleaning, as well as systems and methods for cleaning such structures. Various features and advantages of the invention are set forth in the following claims.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

Priority Patent Documents Incorporated by Reference

U.S. Pat. Pub. No. 2020/0398320 (application Ser. No. 16/639,522), titled "Systems and Methods for Tank Cleaning," filed on 14 Feb. 2020, published on 24 Dec. 2020.

Int'l Pat. Pub. No. WO 2019/036018 (App. No. PCT/US2018/000303), titled "Systems and Methods for Tank Cleaning," filed on 17 Aug. 2018, published on 21 Feb. 2019.

U.S. Prov. App. No. 62/546,859, titled "Systems and Methods for Frac Tank Cleaning," filed on 17 Aug. 2017.

Additional Documents Incorporated by Reference

U.S. Pat. No. 10,884,393 (application Ser. No. 15/582,176), titled "Tank Cleaning System," filed on 28 Apr. 2017, issued on 5 Jan. 2021.

U.S. Pat. No. 10,384,353 (application Ser. No. 15/591,978), titled "System and Method for a Robotic Manipulator System," filed on 10 May 2017, issued on 20 Aug. 2019.

U.S. Pat. No. 10,065,308 (application Ser. No. 14/975,544), titled "Systems and Methods for Chain Joint Cable Routing," filed on 18 Dec. 2015, issued on 4 Sep. 2018.

U.S. Pat. No. 10,035,263 (application Ser. No. 15/341,985), titled "System and Method for Inspection and Maintenance of Hazardous Spaces," filed on 2 Nov. 2016, issued on 31 Jul. 2018.

U.S. Pat. No. 9,981,868 (application Ser. No. 14/748,535), titled "Mobile Processing System for Hazardous and Radioactive Isotope Removal," filed on 24 Jun. 2015, issued on 29 May 2018.

What is claimed is:

1. A tank cleaning system, comprising:

a trailer;

a boom support frame wherein the boom support frame is coupled to a slewing ring bearing, wherein the slewing ring bearing is continuously rotatable, and wherein the slewing ring bearing is coupled to the trailer;

a boom comprising a base and a distal end, wherein the base is coupled to the boom support frame and the distal end is extendable from the base;

an arm comprising a working end and a shoulder pivot joint wherein the shoulder pivot joint is coupled to the distal end of the boom, and wherein a camera is coupled to the arm and is operable to view different positions within a tank or enclosed space;

a display communicatively linked to the camera, the display being positioned remote from the camera to display video of an environment within the tank or enclosed space; and an end effector coupled to the working end of the arm operable to perform one or more of cleaning, maintenance, or inspection operations within the tank or enclosed space.

2. The system of claim 1, further comprising:

a light coupled to the arm and movable to different positions to illuminate the environment within the tank or enclosed space.

3. The system of claim 1, further comprising:

a tool operably attached to the arm and moveable by the arm, wherein the tool comprises at least one of a scraper, a sander, a fastener tool, or a cutting tool.

4. The system of claim 1, further comprising:

a water reservoir and a pump supported on the trailer and in fluid communication with the arm to supply water to the arm and create a pressurized stream exiting at a nozzle.

5. The system of claim 4, further comprising:

a cleaning fluid reservoir, the cleaning fluid reservoir being in fluid communication with the arm to supply cleaning fluid to the arm.

6. The system of claim 1, further comprising:

a water reservoir and a pump supported on at least one of a substrate or the ground and in fluid communication with the arm to supply water to the arm, wherein the water is used to create a pressurized stream exiting at a nozzle.

7. The system of claim 6, further comprising:

a cleaning fluid reservoir, the cleaning fluid reservoir being in fluid communication with the arm to supply cleaning fluid to the arm.

8. The system of claim 1, further comprising:

a cleaning fluid reservoir and a pump, the cleaning fluid reservoir and the pump being in fluid communication with the arm to supply cleaning fluid to the arm.

9. The system of claim 1, wherein the arm is extendible from the trailer with at least one portion of the arm configured to be articulated.

10. The system of claim 1, wherein the boom support frame is configured to move the boom relative to the base and wherein the boom is coarsely positionable relative to an interior of the tank by movement of the trailer and is finely positionable relative to the interior of the tank by way of movement of the boom support frame relative to the boom base.

11. The system of claim 1, wherein the arm has two or more degrees of freedom.

12. The system of claim 1, wherein the arm is rotatable about a horizontal axis.

13. The system of claim 1, further comprising:

at least one sensor coupled to the arm, wherein the at least one sensor is configured to generate arm position feedback signals; and a control unit, wherein the control unit is configured to generate arm control signals based on the arm position feedback signals received from the at least one sensor.

14. The system of claim 1, wherein the arm has a stowed configuration in which the arm is at least one of folded or unfolded upon the boom in a stowed location with respect to the tank or enclosed space, and a deployed configuration in which the arm is unfolded in a different location with respect to the tank or enclosed space.

15. The system of claim 1, wherein the arm is translatable with respect to the trailer through a range of positions in a compact configuration and a stowed configuration, and wherein the arm is movable to a deployed configuration at at least one position in the range of positions.

16. The system of claim 1, wherein at least a portion of the boom is telescoping.

17. The system of claim 1, further comprising:

one or more sensors configured to generate sensor feedback signals; and a control unit configured to generate control signals based on sensor feedback signals, wherein the control unit is remote to the tank or enclosed space.

18. The system of claim 1, further comprising one or more sensors wherein the one or more sensors may be coupled to one or more of the boom, the arm, or the end effector and/or positioned in the tank or enclosed space.

19. The system of claim 18, wherein the one or more sensors comprise one or more of contact sensors, non-contact sensors, capacitive sensors, inductive sensors, 3D imagers, cameras, thermal imagers, thermometers, pressure sensors, accelerometers, inertial measurement units (IMUs), rotary encoders, radiation detectors, LIDARs, or strain sensors.

* * * * *